US008019886B2

(12) United States Patent
Harrang et al.

(10) Patent No.: US 8,019,886 B2
(45) Date of Patent: Sep. 13, 2011

(54) SYSTEMS AND METHODS FOR ENHANCED DATA DELIVERY BASED ON REAL TIME ANALYSIS OF NETWORK COMMUNICATIONS QUALITY AND TRAFFIC

(75) Inventors: Jeffrey Paul Harrang, Sammamish, WA (US); David B Gibbons, Redmond, WA (US)

(73) Assignee: Opanga Networks Inc.

( * ) Notice: Subject to any disclaimer, the term of this patent is extended or adjusted under 35 U.S.C. 154(b) by 0 days.

(21) Appl. No.: 12/763,104

(22) Filed: Apr. 19, 2010

(65) Prior Publication Data

US 2011/0047286 A1 Feb. 24, 2011

Related U.S. Application Data

(60) Provisional application No. 61/235,297, filed on Aug. 19, 2009.

(51) Int. Cl.
*G06F 15/16* (2006.01)
(52) U.S. Cl. ........ 709/232; 709/203; 709/223; 709/224; 709/227; 709/228; 709/233; 709/237
(58) Field of Classification Search .................. 709/203, 709/223, 224, 227, 228, 232, 237, 233
See application file for complete search history.

(56) References Cited

U.S. PATENT DOCUMENTS

| | | | |
|---|---|---|---|
| 5,706,281 A | 1/1998 | Hashimoto et al. | |
| 5,706,428 A | 1/1998 | Boer et al. | |
| 5,726,978 A | 3/1998 | Frodigh et al. | |
| 5,974,460 A * | 10/1999 | Maddalozzo et al. | ........ 709/224 |
| 6,038,224 A | 3/2000 | Kim et al. | |
| 6,052,734 A | 4/2000 | Ito | |
| 6,311,065 B1 | 10/2001 | Ushiki et al. | |
| 6,327,677 B1 | 12/2001 | Garg et al. | |
| 6,339,785 B1 | 1/2002 | Feigenbaum | |
| 6,377,805 B1 | 4/2002 | Anvekar et al. | |
| 6,453,346 B1 | 9/2002 | Garg et al. | |
| 6,493,875 B1 | 12/2002 | Eames | |
| 6,512,865 B1 | 1/2003 | Shen et al. | |
| 6,529,476 B1 | 3/2003 | Magnussen | |
| 6,560,243 B1 | 5/2003 | Mogul | |
| 6,567,415 B1 | 5/2003 | Elwalid et al. | |
| 6,622,172 B1 | 9/2003 | Tam | |
| 6,651,105 B1 | 11/2003 | Bhagwat et al. | |

(Continued)

FOREIGN PATENT DOCUMENTS

DE 19831169 1/2000

(Continued)

*Primary Examiner* — Liangche A Wang
(74) *Attorney, Agent, or Firm* — Michael J. Donohue; Davis Wright Tremaine LLP

(57) ABSTRACT

A system for improving digital data content delivery based on real time analysis of one or more network communications states. The networked computing system may include a network service provider device, a user equipment, a network link monitor, a data transfer agent, and a data communications network facilitating data communications amongst all devices of the networked computing system. The networked computing system may be configured to: detect at least one network communications metric, determine a network communications state associated with diminished communications throughput based on the detected at least one network communications metric, and then select an optimal rate for a data content transfer based on the determined network communications state. The network communications state may relate to either a state of network congestion or a state of reduced regional radio communications quality.

25 Claims, 13 Drawing Sheets

U.S. PATENT DOCUMENTS

| | | | |
|---|---|---|---|
| 6,807,429 B2 | 10/2004 | Subrahmanya | |
| 6,845,398 B1 | 1/2005 | Galensky et al. | |
| 6,910,078 B1 | 6/2005 | Raman et al. | |
| 6,947,388 B1 | 9/2005 | Wagner | |
| 7,058,723 B2 | 6/2006 | Wilson | |
| 7,076,695 B2 | 7/2006 | McGee et al. | |
| 7,085,576 B2 | 8/2006 | Ranganathan | |
| 7,103,906 B1 | 9/2006 | Katz et al. | |
| 7,240,099 B2 | 7/2007 | Miyazaki et al. | |
| 7,349,337 B1 | 3/2008 | Mahdavi | |
| 7,451,205 B2 | 11/2008 | Chueng et al. | |
| 7,454,527 B2 * | 11/2008 | Zhang et al. | 709/249 |
| 7,496,675 B2 | 2/2009 | Obata et al. | |
| 7,512,066 B2 | 3/2009 | Santos et al. | |
| 7,519,030 B2 * | 4/2009 | Cimini et al. | 370/338 |
| 7,533,158 B2 | 5/2009 | Grannan et al. | |
| 7,536,626 B2 | 5/2009 | Sutivong et al. | |
| 7,539,752 B1 | 5/2009 | Chakravarti et al. | |
| 7,543,052 B1 | 6/2009 | Cesa Klein | |
| 7,568,045 B1 | 7/2009 | Agrawal | |
| 7,577,908 B2 * | 8/2009 | Frazier et al. | 715/736 |
| 7,594,260 B2 | 9/2009 | Porras et al. | |
| 7,617,312 B2 | 11/2009 | Tummalapalli | |
| 7,643,461 B2 | 1/2010 | Choi et al. | |
| 7,650,111 B2 | 1/2010 | Dennisson et al. | |
| 7,650,376 B1 * | 1/2010 | Blumenau | 709/203 |
| 7,688,733 B1 * | 3/2010 | Mirza | 370/235 |
| 7,698,416 B2 | 4/2010 | Potti et al. | |
| 7,765,324 B2 | 7/2010 | Imiya | |
| 2002/0021465 A1 | 2/2002 | Moore | |
| 2002/0081971 A1 | 6/2002 | Travostino | |
| 2002/0116555 A1 | 8/2002 | Sommers et al. | |
| 2002/0156910 A1 | 10/2002 | Senda | |
| 2002/0159396 A1 | 10/2002 | Carlson et al. | |
| 2003/0014496 A1 | 1/2003 | Spencer et al. | |
| 2003/0028890 A1 | 2/2003 | Swart et al. | |
| 2003/0084182 A1 | 5/2003 | Mahiddini et al. | |
| 2003/0099201 A1 | 5/2003 | Hu et al. | |
| 2003/0145100 A1 | 7/2003 | Marchetto et al. | |
| 2003/0174677 A1 | 9/2003 | Mantha | |
| 2003/0204769 A1 | 10/2003 | Coughlin | |
| 2003/0221008 A1 | 11/2003 | England et al. | |
| 2004/0002362 A1 | 1/2004 | Chuah et al. | |
| 2004/0003105 A1 | 1/2004 | Berzosa et al. | |
| 2004/0015445 A1 | 1/2004 | Heaven et al. | |
| 2004/0017788 A1 | 1/2004 | Shmueli | |
| 2004/0042398 A1 | 3/2004 | Peleg et al. | |
| 2004/0066746 A1 | 4/2004 | Matsunaga | |
| 2004/0117459 A1 | 6/2004 | Fry | |
| 2004/0122969 A1 | 6/2004 | Ameigeiras et al. | |
| 2004/0143652 A1 | 7/2004 | Grannan et al. | |
| 2004/0168052 A1 | 8/2004 | Clisham et al. | |
| 2004/0218563 A1 | 11/2004 | Porter et al. | |
| 2005/0058138 A1 | 3/2005 | Burcher et al. | |
| 2005/0091395 A1 | 4/2005 | Harris et al. | |
| 2005/0091398 A1 | 4/2005 | Roberts et al. | |
| 2005/0128995 A1 | 6/2005 | Ott et al. | |
| 2005/0132049 A1 | 6/2005 | Inoue et al. | |
| 2005/0165948 A1 | 7/2005 | Hatime | |
| 2005/0169184 A1 | 8/2005 | Murgatroyd et al. | |
| 2005/0193069 A1 | 9/2005 | Brown et al. | |
| 2005/0198680 A1 | 9/2005 | Baran et al. | |
| 2005/0239412 A1 | 10/2005 | Kelz | |
| 2005/0256926 A1 | 11/2005 | Muhonen et al. | |
| 2005/0281270 A1 | 12/2005 | Kossi et al. | |
| 2005/0281277 A1 | 12/2005 | Killian | |
| 2005/0282500 A1 * | 12/2005 | Wang et al. | 455/67.13 |
| 2005/0289630 A1 | 12/2005 | Andrews | |
| 2006/0019665 A1 * | 1/2006 | Aghvami et al. | 455/444 |
| 2006/0025151 A1 | 2/2006 | Karaoguz et al. | |
| 2006/0026296 A1 | 2/2006 | Nagaraj | |
| 2006/0150055 A1 | 7/2006 | Quinard et al. | |
| 2006/0176824 A1 | 8/2006 | Laver et al. | |
| 2006/0268336 A1 | 11/2006 | Sakaniwa et al. | |
| 2006/0277277 A1 | 12/2006 | Landschaft et al. | |
| 2006/0282856 A1 | 12/2006 | Errico et al. | |
| 2007/0025301 A1 | 2/2007 | Petersson et al. | |
| 2007/0066297 A1 | 3/2007 | Jeidari-Bateni | |
| 2007/0086347 A1 | 4/2007 | Reynolds | |
| 2007/0142067 A1 | 6/2007 | Cheng et al. | |
| 2007/0165732 A1 | 7/2007 | Gerlach | |
| 2007/0211674 A1 | 9/2007 | Ragnar Karlberg et al. | |
| 2007/0239695 A1 | 10/2007 | Chakra et al. | |
| 2008/0126919 A1 | 5/2008 | Uskali | |
| 2008/0161951 A1 | 7/2008 | Morris | |
| 2008/0162403 A1 | 7/2008 | Neeakantan | |
| 2008/0165693 A1 | 7/2008 | Castro et al. | |
| 2008/0195745 A1 | 8/2008 | Bowra et al. | |
| 2008/0208963 A1 | 8/2008 | Eyal et al. | |
| 2008/0212509 A1 | 9/2008 | Kim et al. | |
| 2008/0215873 A1 | 9/2008 | Bobrow | |
| 2008/0319833 A1 | 12/2008 | Svendsen | |
| 2009/0100469 A1 | 4/2009 | Conradt et al. | |
| 2009/0164624 A1 | 6/2009 | Metcalf et al. | |
| 2009/0164646 A1 * | 6/2009 | Christian et al. | 709/228 |
| 2009/0327512 A1 | 12/2009 | Chapweske | |
| 2010/0198943 A1 | 8/2010 | Harrang et al. | |

FOREIGN PATENT DOCUMENTS

| | | |
|---|---|---|
| DE | 10208094 | 9/2003 |
| EP | 1587290 | 10/2005 |
| EP | 1841172 | 10/2007 |
| JP | 07336375 | 12/1995 |
| JP | 10124412 | 5/1998 |
| JP | 2005258912 | 9/2005 |
| KR | 102002-0017926 | 3/2002 |
| KR | 102004-0028401 | 4/2004 |
| KR | 100438697 | 7/2004 |
| KR | 100645742 | 11/2006 |
| KR | 10-2007-0013600 | 1/2007 |
| KR | 102007-0011811 | 1/2007 |
| KR | 100693023 B1 | 3/2007 |
| KR | 102007-011719 | 12/2007 |
| KR | 100807264 B1 | 2/2008 |
| KR | 102008-0039324 | 5/2008 |
| WO | 9320637 | 10/1993 |
| WO | WO 0247414 | 6/2002 |
| WO | WO 2004114639 | 12/2004 |
| WO | WO 2005120122 | 12/2005 |
| WO | WO 2006099545 | 9/2006 |

* cited by examiner

SYSTEMS AND METHODS FOR ENHANCED DATA DELIVERY BASED ON REAL TIME ANALYSIS OF NETWORK COMMUNICATIONS QUALITY AND TRAFFIC

CROSS REFERENCE TO RELATED APPLICATIONS

The present application claims the benefit of U.S. Provisional Application No. 61/235,297, filed Aug. 19, 2009.

FIELD OF THE INVENTION

The technical field of the present invention generally relates to systems and methods for monitoring network channel capacity and data transfer metrics within a distributed communications system. More specifically, the invention allows one or more networked devices to make informed decisions as to whether or not to throttle a data transfer session, based on real time evaluations of network communications states associated with network traffic and radio communications quality.

BACKGROUND OF THE INVENTION

With the evolution of modern data communications networks, vast amounts of digital content can now be readily transferred amongst end users, media content providers, and network service providers, at relatively high data transfer rates at almost any location. Whether digital content distribution occurs over wireline networks, such as fiber-optic or cable networks, or over wireless networks, such as 3G, 3GPP LTE, LTE Advanced, or 4G cellular networks, the task of increasing communications service capability and maximizing the utilization of existing network communications resources remains a key objective for most network service providers.

Over the past decade, consumer exposure to state-of-the-art digital media content distribution and playback technologies (e.g., tablet computers, netbooks, multi-function cellular phones, PDAs, electronic-book devices, etc.) has created a significant demand for improved digital content delivery capability, and most service providers have struggled to provide sufficient communications infrastructure to keep up with this growing consumer demand. Presently, there are many different types of data communications networks available that can function independently (e.g., as Local Area Networks or LANs) or collectively as part of a group of interconnected networks (e.g., Wide Area Networks or WANs), such as the World Wide Web. Some of these networks include technologies that facilitate relatively fast, high data rate transmissions (e.g., Fiber-optic, Cable, and Digital Subscriber Line (DSL) networks), while others can only facilitate much slower data rate transmissions (e.g., 3G cellular networks). Regardless of a network's type, topology, or employed technologies, almost all modern-day networks are susceptible to congestion or degradation due to a high demand for transferring an alarming amount of digital content between and amongst various network nodes.

As would be understood by those skilled in the art, network congestion generally refers to a state of data transfer overload (a load that burdens network capacity) between links in a data communications network. These heavy loads typically degrade a network's Quality of Service (QOS) and user's Quality of Experience (QOE). Some negative effects of network congestion, affecting QOS/QOE, may include queuing delay, packet loss, and the blocking of new and existing connections.

Mobile broadband services are also becoming very popular in modern society, where almost every teenager and adult in the U.S. owns at least one wireless communications device (e.g., a cellular phone or PDA). These services can provide a way for individuals to stay connected to the Internet while operating within and roaming between various wireless coverage areas. A concurrent trend is the huge increase in applications and media content distribution services that can facilitate the delivery of large, burdensome media content files to or from user equipment. Large media content file transfers have the signature feature of consuming significant amounts of network resources (i.e., channel bandwidth) over extended periods of time. Methods of enabling and making this particular data type delivery more efficient are very important to end users and service providers alike. The processes facilitating more efficient media content delivery are particularly relevant for wireless networks that have limited bandwidth resources.

Most wireless networks operate using shared communications channels where concurrent, competing requests for channel access is commonplace. In these networks, data transfers can be slowed or degraded during periods of network channel congestion (e.g., during periods of heavy network traffic) or during times when an end user is positioned in an area with relatively poor radio coverage or radio communications quality (e.g., in areas with physical or radio communications interference sources). Each of these problems can negatively impact network communications for an end user, however, congestion tends to more significantly impact a network service provider's QOS as well as the QOE encountered by its collective users. Accordingly, it would be advantageous to be able to distinguish between the two sources of network communications deficiency, by accurately determining if the cause of decreased communications throughput was due to a state of network congestion, a state or reduced radio communications quality, or both.

In general, during a state of network congestion, it would be beneficial to be able to adaptively throttle a large media content delivery session, by adjusting its data delivery rate. This would prevent further congesting a network during periods of network resource exhaustion. By selectively choosing network data delivery times and data transfer rates, providers could effectively utilize network resources when surplus network bandwidth exists, as opposed to allowing a large media content file delivery to compete with unrelated cross traffic during periods of peak network resource use.

Accordingly, it would be beneficial to have improved systems and methods for data content delivery that could distinguish between network congestion and network link quality (e.g., link quality in the presence of one or more interference sources). This distinction is necessary, because when a wireless communications channel is operating at capacity, large media content file transfers may need to be slowed to avoid negatively impacting unrelated cross traffic that is concurrently sharing the same communications channel. In contrast, when a wireless communications channel is not operating at capacity, but an end user happens to be in an area of reduced radio communications quality, an otherwise uncongested radio channel should proceed with the data content delivery as quickly as the network will allow, because the transfer session will likely not affect cross traffic (even when proceeding at a maximum transfer rate).

There may also be scenarios where multiple media content deliveries for large media content files are concurrently being transferred on the same, shared communications channel. In these scenarios it would be advantageous to be able detect that congestion is arising from multiple media content delivery sessions, as opposed to unrelated cross traffic. This could facilitate real time decision making as to whether or not to reschedule or alter data content deliveries in such a way that would avoid slowing data transfer rates below an aggregate rate that completely utilizes a communications channel. By knowing what data content is being transferred, channel resource utilization can be maximized at all times. This is so, because media content deliveries are generally considered to be lower priority data transfer tasks compared to other, less burdensome types of data communications, such as voice communications.

Another feature of large data content file delivery is that data transfers can occupy significant periods of time and they may be scheduled to start at random intervals. Both of these features may result in frequent communications between user equipment and the network for communications of both control/signaling information and actual media content data. To facilitate efficient deliveries, it would be beneficial if these frequent communications could be coordinated to minimally impact the resident resource (e.g., battery power, processor usage, available memory, etc.) consumption at a user equipment. This could reduce the effect that the media content transfer would have on the user equipment during periods when one or more resident device resources was in a state of resource exhaustion (e.g., low battery power, an overburdened processor, of reduced free memory, etc.). By selectively coordinating data content deliveries towards periods when resident device resources are not in a reduced state, more important processes supported by the user equipment (e.g., voice communications, texting, web browsing, etc.) could be prioritized, until a time when sufficient resources become available (e.g., when a user equipment is plugged into a local power supply) for lower priority media content delivery tasks.

Accordingly, it would be desirable to have robust new systems and methods that could align data transfer sessions for burdensome media content away from peak periods of network use (periods associated with high levels of network traffic), towards periods of surplus network capacity, by accurately detecting a state of network congestion that is distinguished from a state of reduced radio communications quality. It would further be advantageous if these systems and methods could operate by automatically detecting, coordinating, and delivering burdensome media content to one or more end receiving device(s), such that a typical user would be unaware of how these underlying data transfer rate optimization/throttling processes functioned. As a result, an average network user's QOE should improve, while the underlying processes facilitating the improvement would remain transparent. It would further be desirable if these systems and methods could discern between congestion created by cross traffic as opposed to congestion created by other media content transfers occurring on the same communications channel. This would allow a service provider to fully utilize its network channel resources at all times and to prioritize some data communications processes over others (e.g., media content transfers would typically be lower priority data transfers). It would also be helpful if these systems and methods facilitated real time monitoring of user equipment resources, such that when local resources (e.g., battery power, processor usage, available memory, etc.) were in a state or resource exhaustion, a media content delivery could be slowed or halted until the resources were replenished or became available at the user equipment. These real time solutions could be used to mitigate situations where large media content deliveries would otherwise degrade or impair communications on a network communications channel for a network's collective users.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with digital data content delivery systems and methods of the Prior Art, the present invention discloses an improved networked computing system for delivering digital data content. In an embodiment, the networked computing system includes a network service provider device, a user equipment, a network link monitor, a data transfer agent, and a data communications network facilitating data communications amongst all devices of the networked computing system. The networked computing system may be configured to: detect at least one network communications metric, determine a network communications state associated with diminished communications throughput (based on the detected at least one network communications metric), and then select an optimal rate for a data content transfer based on the determined network communications state.

In accordance with another aspect of the invention, the network communications state may relate to a state of network congestion or a state of reduced regional radio communications quality.

In accordance with a further aspect of the invention, the network link monitor may determine the network communications state and then communicate the determined network communications state to the data transfer agent. In an embodiment the network link monitor may communicate with the data transfer agent via relay through the user equipment, such that the user equipment passed along communications from the network link monitor to the data transfer agent.

In accordance with another aspect of the invention, the data transfer agent may determine whether to change the rate for the data content transfer based on the received network communications state.

In accordance with yet a further aspect of the invention, the at least one network communications metric may be any of an employed modulation and coding scheme (MCS), a signal to interference plus noise ratio (SINR), a remaining link capacity, or a designated peak throughput for at least one service subscriber.

In accordance with another aspect of the invention, the data transfer agent may be a component of the network service provider device and the network link monitor may be a component of the user equipment.

In accordance with a further aspect of the invention, is a computer-readable medium encoded with computer-executable instructions for delivering digital data content, which when executed, may perform processes of: detecting at least one network communications metric with a network link monitor, determining a network communications state associated with diminished communications throughput (based on the detected at least network communications metric), and then selecting a rate for the data content transfer with a data transfer agent based on the determined network communications state.

In accordance with yet another aspect of the invention, is a computer-implemented method for delivering digital data content, the method including processes for: detecting at least one network communications metric with a network link monitor, determining a network communications state associated with diminished communications throughput (based on the detected at least network communications metric), and selecting an optimal rate for the data content transfer with a data transfer agent based on the determined network communications state.

In accordance with another aspect of the invention, is a user equipment for affecting determinations associated with a data content transfer. The user equipment may include: one or more processors, one or more memory storing a network link monitor, and a data communications component. The network link monitor of the user equipment may be configured to: detect at least one network communications metric, and determine a network communications state associated with diminished communications throughput, based on the detected at least one network communications metric. The user equipment may be further configured to transfer the determined network communications state to a network service provider device in order to facilitate a determination of an optimal rate for a data content transfer.

In accordance with a further aspect of the invention, the network communications state may relate to a state of network congestion or a state of reduced regional radio communications quality. The determined network communications metric(s) may be an employed modulation and coding scheme (MCS), a signal to interference plus noise ratio (SINR), a remaining link capacity, or a designated peak throughput for at least one service subscriber.

BRIEF DESCRIPTION OF THE DRAWINGS

Preferred and alternative examples of the present invention are described in detail below with reference to the following Figure drawings.

DETAILED DESCRIPTION

Figure 1:
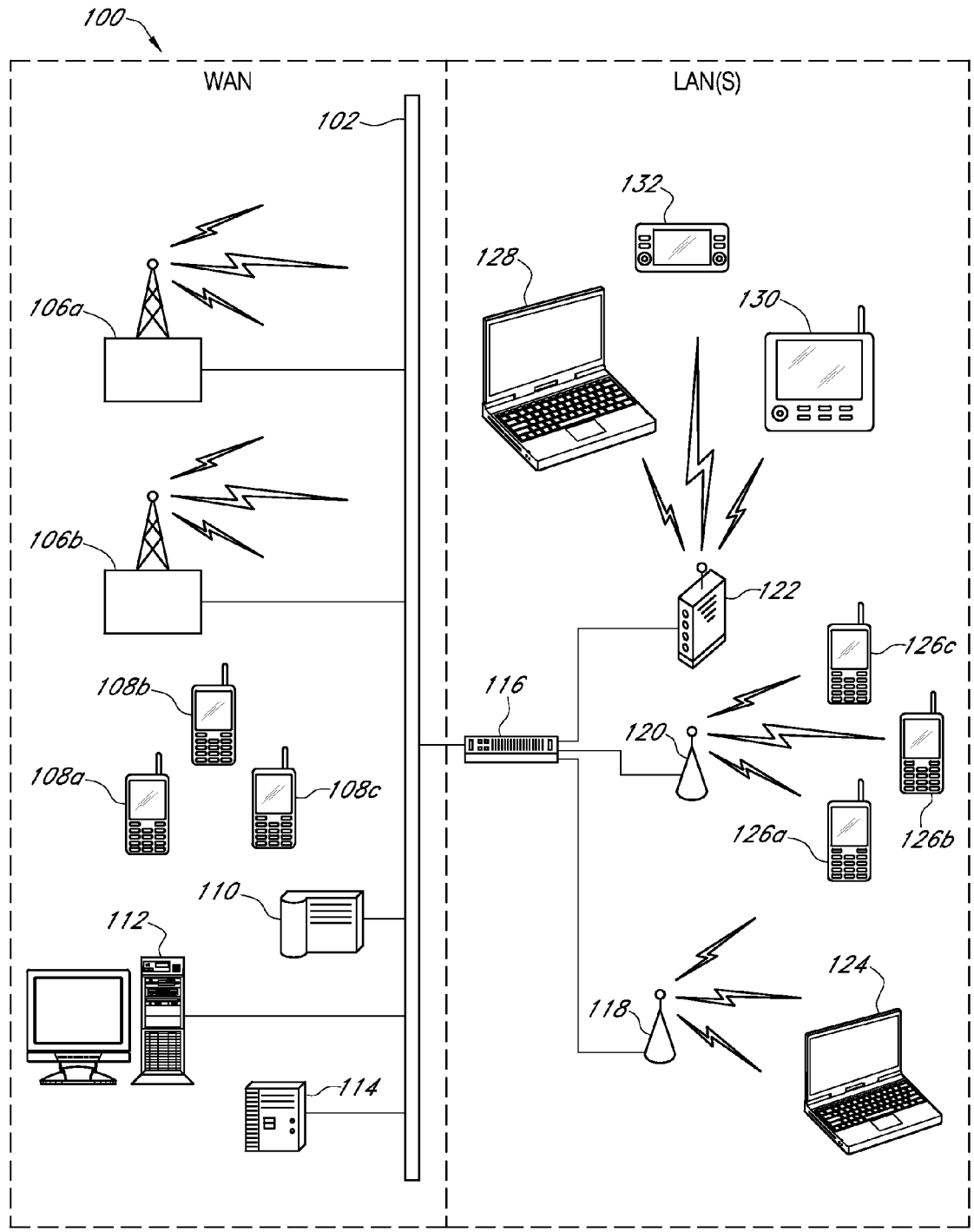
FIG. 1 illustrates a perspective view of a distributed data communications system in accordance with embodiments of the present invention.

In accordance with an exemplary embodiment of the present invention, FIG. 1 illustrates a networked computing system 100 including various wireline and wireless computing devices that may be utilized to implement any of the network traffic and radio communications quality monitoring or data content transfer optimization processes associated with various embodiments of the present invention. The specific network configuration shown in FIG. 1 is intended to give an example of a high-level computing system capable of facilitating various network communications processes of the present invention, all of which are further described herein. As would be understood by those skilled in the Art, many network configuration and topology changes could be made to the networked computing system 100 of FIG. 1, without departing from the spirit and scope of the present invention.

In an embodiment, the networked computing system 100 may include, but is not limited to, a group of service provider devices 110, 112, 114 and 116 (SPDs), including server computers (e.g., network controller devices) or any other common network device known in the Art, such as a routers, gateways, or switch devices, which can support network resource allocation and/or digital data communications services to various user equipment (e.g., any of devices 108a-c, 124, 126a-c, 128, 130 and 132) within the networked computing system 100; a data communications network 102 (including both Wide Area Network (WAN) and Local Area Network LAN(S) portions); a variety of remote user equipment, including cellular phone or PDA devices 108a-c along with any other variety of portable wireless computing device well known in the Art (e.g., tablet computers netbooks, electronic book devices, handheld gaming units, personal music players, video recorders, Wi-Fi™ devices, etc.) that may be connected to the data communications network 102 utilizing one or more wireless base stations 106a-b, or any other common wireless or wireline network communications technology; one or more network gateways, routers, or switch devices 116 that can facilitate data communications processes within the LAN(S) and between the LAN(S) and the WAN of the data communications network 102; one or more local user equipment, including: laptop or netbook computers 120 and 128, wireless cellular phones or PDAs 126a-c, electronic book devices 130, handheld gaming units 132, personal music players, video recorders, Wi-Fi™ devices, etc., that may be wirelessly connected to one or more local or remote network base stations 106a-b, 118, 120, and 122, or optionally directly or indirectly connected to a backhaul portion of the network (e.g., to data communications network 102) via any common wireline or wireless communications technology known in the Art.

In an embodiment, any of the SPDs 110, 112, and 114 (including any of the network base stations 106a-b, 118, 120, and 122), the router, gateway, or switch device(s) 116, or any of the remote or local user equipment 108a-c, 124, 126a-c, 128, 130, and 132, may be configured to run any known operating system, including but not limited to, Microsoft® Windows®, Mac OS®, Linux®, Unix®, Google® Chrome®, or any common mobile operating system, including Symbian®, Palm®, Windows® Mobile®, Mobile Linux®, Google® Android®, etc. In an embodiment, any of the SPDs 106a-b, 110, 112, 114, 116, 118, 120, and 122 may employ any number of common server, desktop, laptop, and personal computing devices. In an embodiment, the user equipment 108a-c, 124, 126a-c, 128, 130, and 132 may include any combination of common mobile computing devices (e.g., laptop computers, netbook computers, cellular phones, PDAs, handheld gaming units, electronic book devices, personal music players, video recorders, etc.), having wireless communications capabilities employing any common wireless data commutations technology, including, but not limited to: Wi-Fi™ WiMAX™, GSM™, UMTS™, LTE™, LTE Advanced™, etc.

In an embodiment, the LAN or the WAN portions of the data communications network 102 may employ any of the following common communications technologies: optical fiber, coaxial cable, twisted pair cable, Ethernet cable, and powerline cable, along with any wireless communication technology known in the Art. In an embodiment, any of the SPDs 110, 112, and 114, including any of the network base stations 106a-b, 118, 120, and 122, the router, gateway, switch device(s) 116, or any of the remote or local user equipment 108a-c, 124, 126a-c, 128, 130, and 132, may include any standard computing software and hardware necessary for processing, storing, and communicating data amongst each other within the networked computing system 100. The computing hardware realized in any of the data networked computing system 100 computing devices 106a-b, 108a-c, 110, 112, 114, 116, 118, 120, 122, 124, 126a-c, 128, 130, and 132 may include, but is not limited to: one or more processors, volatile and non-volatile memories, user interfaces, transcoders, and wireline and/or wireless communications transceivers, etc.

In an embodiment, any of the SPDs 110, 112, and 114 (including any of the network base stations 106a-b, 118, 120, and 122), the router, gateway, switch device(s) 116, or any of the remote or local user equipment 108a-c, 124, 126a-c, 128, 130, and 132, may be configured to include one or more computer-readable media (e.g., any common volatile or nonvolatile memory type) encoded with a set of computer readable instructions, which when executed, performs a portion of one or more of the network traffic and radio communications quality monitoring or data content transfer optimization processes associated with various embodiments of the present invention.

Figure 2:
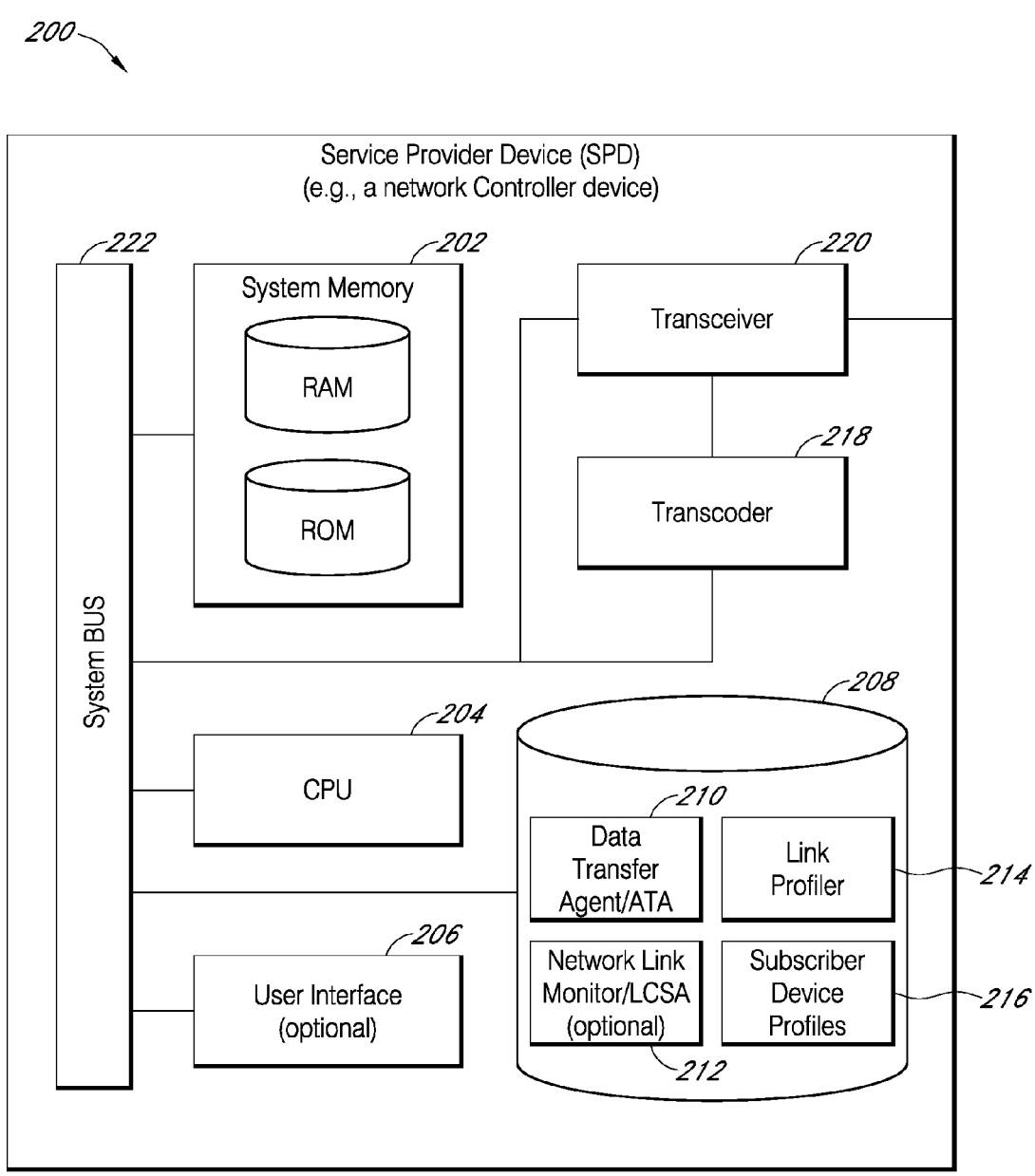
FIG. 2 illustrates a block diagram view of a service provider device in accordance with embodiments of the present invention.

FIG. 2 shows a block diagram view of a SPD 200 that may be representative of any of the remote service provider devices SPDs 110, 112, and 114 (including the network base stations 106a-b, 118, 120, and 122), and the router, gateway, switch device(s) 116 of FIG. 1, or any other common network service provider device known in the art. The SPD 200 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 is responsible for executing all computer programs stored on the SPD's 200 volatile (RAM) and nonvolatile (ROM) system memories, 202 and 208.

The SPD 200 may also include, but is not limited to, an optional user interface 206 that allows a service provider administrator to interact with the SPD's 200 software and hardware resources; a software/database repository 208 including: a data transfer agent 210 (also referred to herein as an adaptive throttling agent or ATA) that may facilitate real time adjustment of data transfer rates based on comparisons of maximum link throughput to actual link throughput received from one or more user equipment (as a feedback) or from a local or external link capacity monitor, an optional network link monitor 212 that may be capable of monitoring actual link throughput for particular network links of interest (also referred to herein as a link capacity sensing agent or LCSA), a link profiler 214 that is capable of determining a current throughput capacity for a series of network links between a sender and a receiver, and a subscriber devices profiles data base 216 that is able to store user equipment profile and resident exhaustible resource information (information pertaining to battery power, processor usage, available memory, etc.); a transceiver 220 for transmitting and receiving network data communications amongst various network user equipment (e.g., any of devices 108a-c, 124, 126a-c, 128, 130, and 132) and SPDs (e.g., any of SPDs 106a-b, 110, 112, 114, 118, 120, 122, and 116) utilizing the data communication network 102 of the networked computing system 100; and a system bus 222 that facilitates data communications amongst all the hardware resources of the SPD 200.

In accordance with an embodiment of the present invention, the SPD 200 data transfer agent 210 may be logically linked to the link profiler 214 and the optional network link monitor 212 (or alternately to an external network link monitor component 312), such that the data transfers between a sender and receiver device (e.g., between a SPD 200 or a media content provider, and a user equipment 300) may be optimally managed (e.g., by throttling a data transfer rate or selecting preferred periods for data content delivery) based on real time evaluations of network traffic and radio communications quality for communications links that are part of the communications path between (and optionally including) the sending and receiving devices.

Figure 3:
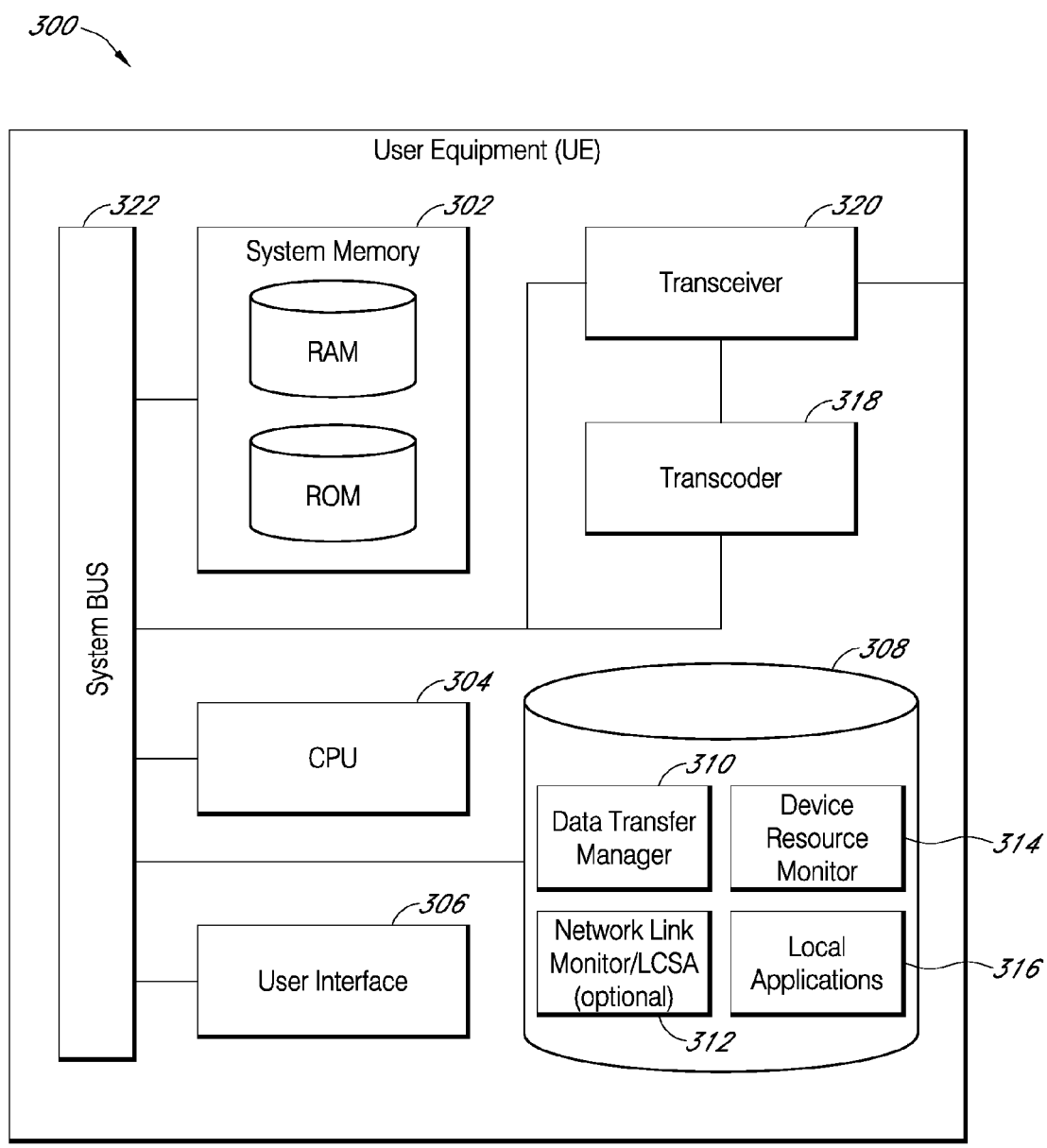
FIG. 3 illustrates a block diagram view of a user equipment in accordance with embodiments of the present invention.

FIG. 3 shows a block diagram view of a user equipment 300 that may be representative of any of the user equipment 108a-c, 124, 126a-c, 128, 130, and 132 in FIG. 1. The user equipment 300 may include, but is not limited to, one or more processor devices including a central processing unit (CPU) 304. In an embodiment, the CPU 304 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the user equipment's 300 volatile (RAM) and nonvolatile (ROM) system memories, 302 and 308.

The user equipment 300 may also include, but is not limited to, a user interface 306 that allows a user to interact with its 300 software and hardware resources; a software/database repository 308 including: a data transfer manager 310 that facilitates communications amongst the user equipment 300, various SPDs (e.g., any of SPDs 106*a-b*, 110, 112, 114, 116, 118, 120, and 122), network service providers (e.g., media content providers), as well as other user equipment (e.g., any of user equipment 108*a-c*, 124, 126*a-c*, 128, 130, and 132) utilizing the data communication network 102 of the networked computing system 100, a network link monitor 312 that may be capable of monitoring actual link throughput for particular network links of interest (also referred to herein as a link capacity sensing agent or LCSA), a device resource monitor 314 that may be capable of monitoring resident device resources (e.g., such as power supply, processing, memory, and communications resources), and a local applications repository for storing various end user applications that can allow the user equipment 300 to perform various user preferred processes utilizing resident hardware and software resources; a transcoder 318 for formatting data communications prior to transfer; a transceiver 320 for transmitting and receiving network communications amongst other network user equipment (e.g., any of user equipment 108*a-c*, 124, 126*a-c*, 128, 130, and 132), media content providers, and SPDs (e.g., any of SPDs 106*a-b*, 110, 112, 114, 116, 118, 120, and 122) utilizing the data communication network 102 of the networked computing system 100; and a system bus 322 that facilitates data communications amongst all the hardware resources of the user equipment 300.

In accordance with an embodiment of the present invention, the user equipment's 300 data transfer manager 310 may be logically linked to the network link monitor 312 (or alternately to an external network link monitor), and the device resource monitor 314, such that the user equipment 300 can monitor external network link capacities as well as its resident exhaustible resources in order to affect data transfers between itself and an external computing device (e.g., a SPD 200, a media content provider, or another user equipment). In an embodiment, in response to analyzing data obtained from the user equipment's 300 network link monitor 312 and/or device resource monitor 314, a data delivery to the user equipment 300 may be optimally managed (e.g., by throttling a data transfer rate or selecting preferred periods for data content delivery). This management may be based on real time evaluations of network traffic and radio communications quality for communications links that are part of the communications path between (and optionally including) sending and receiving (e.g., the user equipment 300) devices. These communications and their associated control processes will be further described herein.

In accordance with various embodiments, at least the following communications scenarios would be facilitated by the present invention. In a first scenario, a user equipment 300 may request a delivery from a media content provider (a sender device) for a large media content file (e.g., a media content relating to music, a movie, a TV show, a software application, an e-book, a podcast, etc.) to their wireless device 300 using a specific wireless communications protocol that utilizes surplus network bandwidth for the delivery (e.g., throttling the delivery to transfer more data during periods with excess network bandwidth). One or more network devices (e.g., user equipment 300 or SPDs 200) employing the communications protocol may sense a state of network channel congestion (e.g., using a network link monitor 212, 312) by: monitoring the performance of the media content file delivery over one or more network specific segments (e.g., by measuring/analyzing one or more network communications metrics), measuring and end-to-end link throughput performance for the combined network segments (e.g., with a receiver device, such as user equipment 300), and then comparing individual segment throughput with total end-to-end link throughput. By following these procedures, not only can network congestion be detected (via the comparison), but it can also be determined which network segment(s) may be the source of a congestion bottleneck.

As the network link(s) facilitating the delivery become congested with cross traffic (e.g., other data transfers on the same channel of unrelated data types), and the congestion is detected (as discussed in the previous paragraph), the network device 200, 300 employing the protocol can, independently or in collaboration with one or more external network devices 200 (also employing the protocol), throttle the media content delivery rate (e.g., via a data transfer agent 210 and/or a data transfer manager 310) to avoid negatively impacting other cross traffic communications.

In a second scenario, having a similar initial fact pattern to the first scenario, the wireless network channel may become uncongested as the user equipment 300 moves amongst different regional locations within the wireless network having varying wireless channel quality (e.g., by moving closer or farther away from the wireless base station or by moving to an area with more physical or radio interference sources; See e.g., FIG. 4A). Similar to the first scenario, the change in delivery performance of the media content delivery is detected by a monitoring device 200, 300 utilizing the communications protocol. However, in the second scenario, wireless channel link quality (radio communications quality) information may be utilized to initially determine that the channel is not congested and accordingly a data transfer manager 310 or agent 210 may decide not to throttle the data transfer delivery rate, because poor radio communications quality is not related to network traffic. In an embodiment, when a radio communications quality is determined in an uncongested network (e.g., by a network link monitor 212, 312), a data transfer rate may be optionally increased to improve the data content delivery.

In a third scenario, multiple user equipment (e.g., any of the user equipment 108*a-c*, 124, 126*a-c*, 128, 130, and 132 of FIG. 1) may request concurrent media content deliveries from one or more media content providers or senders. The sum of the data transfer requests may be sufficient to congest the shared network communications channel. The network device 200, 300 employing the delivery protocol senses the state of network congestion by monitoring the performance of the media content file delivery (e.g., using a network link monitor 212, 312). The monitor 212, 312 senses the slowing and throttles the delivery rate, but in this instance wireless channel traffic information may be utilized to determine when a channel is no longer congested, to avoid further slowing.

In yet another scenario, a user equipment 300 may request a large media content file for delivery from a remote media content provider. The user equipment 300 employing a delivery protocol may be able to sense a current state of remaining battery power (e.g., using a device resource monitor 314). In an embodiment, when sufficient battery life remains at the user equipment 300, or when it is connected to a local power supply, the media content transfer may be allowed to proceed at a designated data transfer rate, without throttling. However, when insufficient battery power is detected at the user equipment 300, the data transfer manager 310 may facilitate throttling the data transfer by slowing or temporarily stopping communications in order to preserve the remaining battery power for higher priority communications (e.g., preserving battery power for voice communications).

Figure 4A:
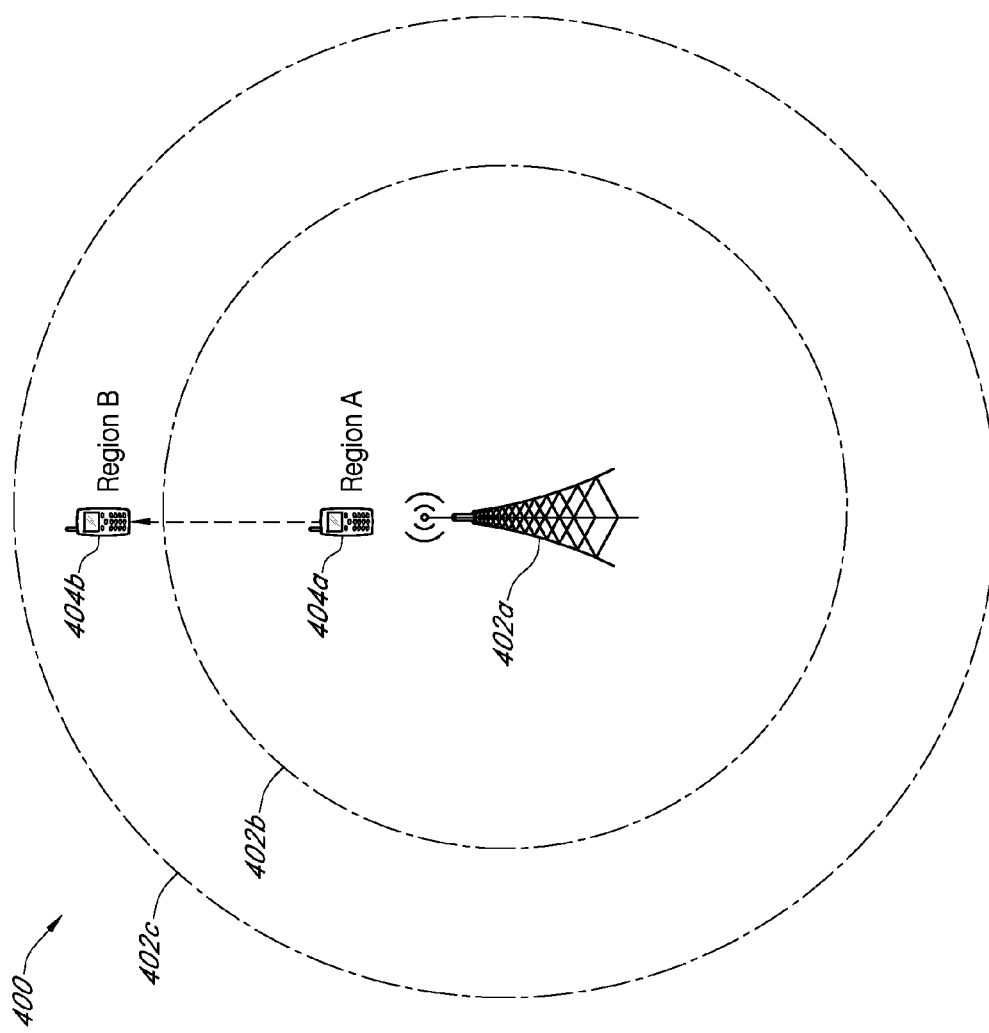
FIG. 4A illustrates a network topology with a user equipment positioned within various regional locations that have characteristics associated with different network communications states, in accordance with embodiments of the present invention.

FIG. 4A depicts a network topology 400 with a user equipment 404a-b (which may be representative of any of the user equipment 108a-c, 124, 126a-c, 128, 130, and 132 of FIG. 1) positioned within various regional locations (Regions A: encompassed by coverage area 402b, or Region B: encompassed by coverage area 402c) that have characteristics associated with different network communications states, in accordance with embodiments of the present invention. Within the network topology 400, a network base station 402a (which may be representative of any of the network base stations 106a-b, 118, 120, and 122 of FIG. 1) may supply wireless communication service to one or more regional user equipment 404a-b. Initially, the user equipment 404a may be located in an area of relatively good radio communications link quality 402b (i.e., Region A), however, sometime later the user equipment 404b may be relocated to another location within the cell that is characterized by poor radio communications link quality 402c (i.e., Region B). For the purpose of illustration the single user equipment is represented by references numbers 404a and 404b, which indicate a change in the physical location of the device; this is also represented by the dotted line with an arrowhead indicating the direction of movement for the device between Regions A and B.

As would be understood by those skilled in the Art, the same change in radio communications link quality could occur without any movement of the user equipment 404a (e.g., when the user equipment 404a remains within the coverage area 402c of Region A). In this alternate, stationary scenario, sources of interference (e.g., physical interference sources that have moved within the link path between the user equipment 404a and the base station 402a, or new radio communications interference, caused by the addition of pico or femto base station interference) may also cause states of reduced radio communications quality.

Figure 4B:
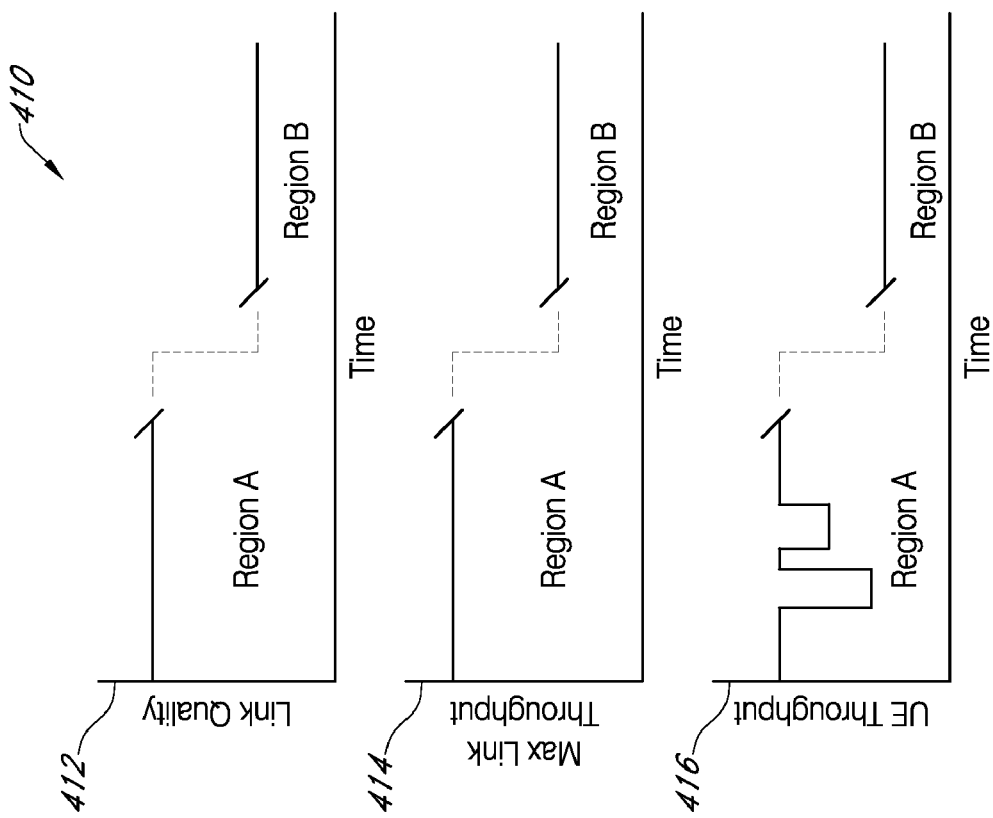
FIG. 4B illustrates link quality, maximum link throughput, and actual UE throughput time-sequence graphs that are associated with the regional locations A and B depicted in FIG. 4A, in accordance with embodiments of the present invention.

FIG. 4B illustrates three separate graphs 410 depicting link quality 412, maximum link throughput 414, and actual UE throughput 416 as a function of time. These graphs 410, 412, and 414 describe the first scenario where the user equipment 404a transitions from Region A to its new position 404b in Region B. In the first graph 412, initial link quality is shown to be relatively high, corresponding to the user equipment's 404a proximity to the network base station 402a. Some time later, as the user equipment transitions to its new position 404b within Region B (further away from the network base station 402a), link quality is shown to be significantly lowered, compared to its initial state in Region A.

In general, as would be understood by those skilled in the Art, link quality may be determined by evaluating one or more network communications metrics or factors (collectively referred to herein as "network communications metrics"), including, but not limited to: a modulation and coding scheme (MCS) employed by a user equipment 200, a signal-and-interference-to-noise ratio (SINR) value, a wireless provider service level agreement or local user equipment policy controlling the peak throughput rates for communications between a base station 402a and a user equipment 404a-b, a wireless link flow-control algorithm, a wireless link scheduling algorithm, the remaining free capacity on the wireless link, etc. In an embodiment, several of these network communications metrics may be dynamic and accordingly they may need to be averaged or filtered to establish time-stable values for accurate evaluation.

In an embodiment, the network communications metrics may be evaluated to determine the maximum link throughput 414, which is shown to qualitatively track the link quality graph 414 between Regions A and B (i.e., from high to low). In contrast, the actual measured UE throughput graph 416 does not always track the link quality 412 and the max link throughput 414 graphs. While at some times UE throughput 416 may be equal to the maximum link throughput 414 (e.g., when the network base station 402a has sufficient wireless resources to allow traffic with the user equipment 404a-b to flow at the maximum link rate), at other times, the UE throughput 416 may dip below the maximum link throughput 414, when the network base station 402a has insufficient wireless resources to simultaneously satisfy the traffic demands of the user equipment 404a-b as well as various other network user equipment (not shown) sharing the communications link (e.g., during a state of heavy traffic or network communications link congestion).

It is important to recognize that a comparison of the maximum link throughput graph 414 with the actual UE throughput graph 416 emphasizes instances when link congestion (e.g., congestion changes depicted within the same network region: Region A or Region B) can be differentiated from shifts in link quality (e.g., the quality shift indicated between Regions A and B). It is generally unnecessary for the actual UE throughput 416 to exactly quantitatively track the calculated maximum link throughput 414 since persistent offsets can be nullified (subtracted away) using long term averages of the differences between the two throughputs.

Figure 5:
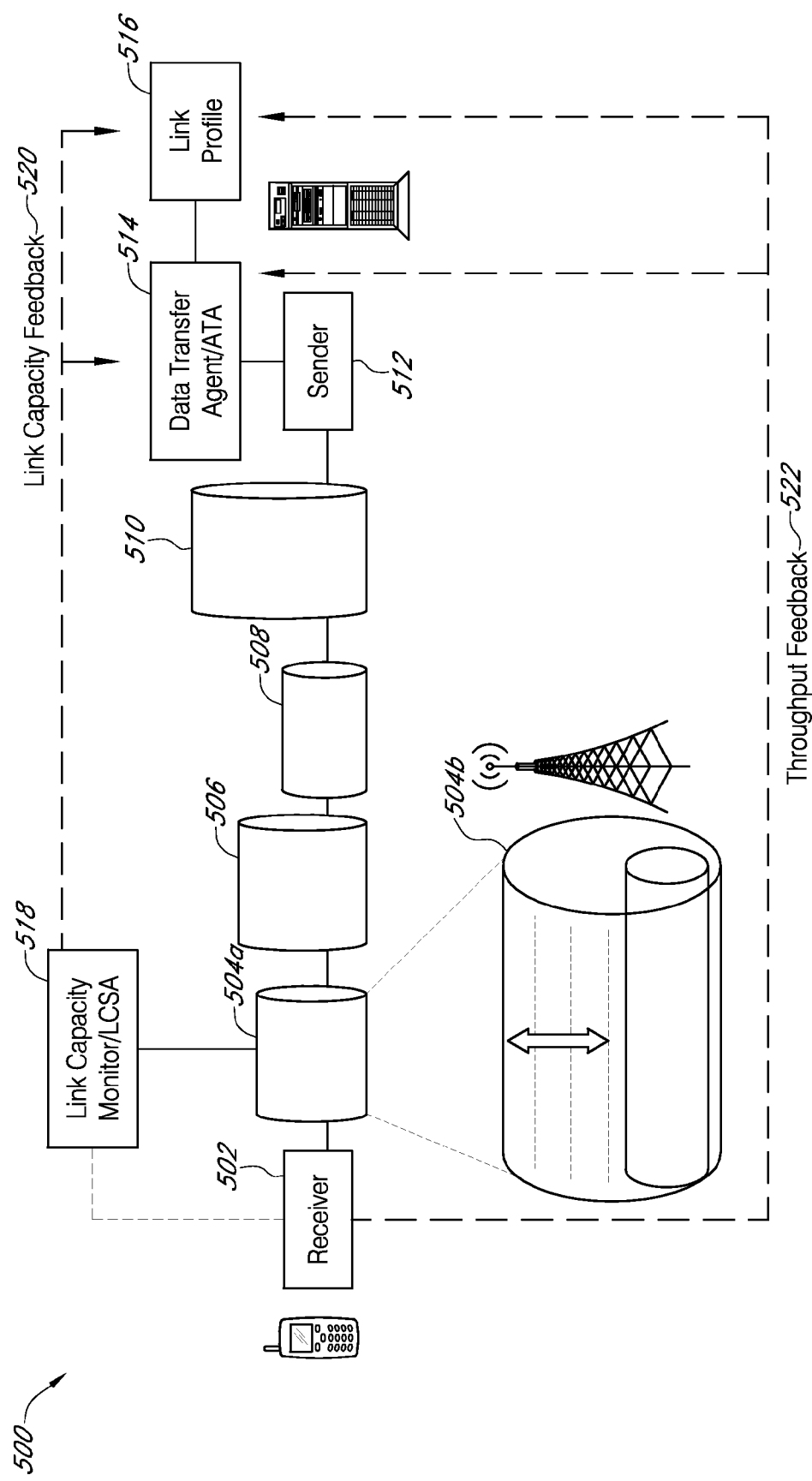
FIG. 5 illustrates a data communications system capable of performing link capacity sensing and data transfer rate optimization processes, in accordance with embodiments of the present invention.

FIG. 5 illustrates a data communications system 500 capable of performing link capacity sensing and data transfer rate optimization processes, in accordance with embodiments of the present invention. The components of the system include a receiver device 502 (e.g., any of the user equipment 108a-c, 124, 126a-c, 128, 130, and 132 of FIG. 1), multiple channel segments or links 504a-b, 506, 508, and 510 (e.g., such as between network base stations 106a-b, 118, 120, and 122, routers, gateways, switches 116, etc.), a sender device 512 (e.g., such as a media content provider or a SPD controller 110, 112, and 114), a link capacity monitor/link capacity sensing agent (LCSA) 518, a data transfer agent/adaptive throttling agent (ATA) 514, and a link profiler 516.

The network communications system depicts an embodiment illustrating how the invention could work, assuming that the multiple channel segments 504a-b, 506, 508, and 510 were connecting the sender 512 and receiver 502 devices. The channel segments 504a-b, 506, 508, and 510 may be capable of facilitating a media content delivery via various combinations of wireless and wireline communications technologies. In an embodiment, each network channel segment 504a-b, 506, 508, and 510 could be formed from one or more networked elements having a characteristic throughput capacity for carrying traffic across a current network channel segment (e.g., any of segments 504a-b, 506, 508, and 510). For sake of illustration simplicity, no distinction is shown for throughput directionality (e.g., swapping sender and receiver functions) which could in practice be very different (e.g., channel segments with greater downlink capacity than uplink capacity). It should be understood that these distinctions would not alter the network architecture depicted in system 500.

In an embodiment, the sender device 512 may transmit digital content (e.g., a media content file) to a receiving device 502 through a plurality of network segments 504a-b, 506, 508, and 510 at a particular point in time. In an embodiment, the sender 512 could also be concurrently orchestrating data delivery jobs to one or more other regional receivers 502, although for illustration only a single receiver 502 is shown in FIG. 5. The size of each network channel segment 504a-b, 506, 508, and 510 is intended to convey its relative communications capacity. At least one network segment 504a has the property that its throughput capacity (depicted in the exploded view of the channel segment 504b, which could represent a network base station) can change over time due to factors that are unrelated to shared-link congestion.

In various embodiments, the network segment 504a may be an intermediary device (e.g., a gateway, router, or switch 116) in a sequence of chained segments forming the network path from a sender 512 to a receiver 502, or it may be the last segment in the chain 504a-b, as would be typical in a wireless deployment where the segment 504a represented a network base station. It should be understood that there could be multiple, similar segments with time-varying capacity, although only one segment 504a is depicted having this characteristic in FIG. 5.

In an embodiment, the time-varying segment 504a may be in communication with, or it may alternately host, a link capacity monitor 518. The link capacity monitor 518 could also be a part of a receiver 502 (e.g., a LCSA 312 that is part of a user equipment 200, or a LCSA 212 that is part of a SPD 200). In an embodiment, the link capacity monitor 518 may be associated with an ingress, an egress, or an internal node element of the network segment's 504a-b having the ability to determine the network segment's 504a capacity in real time. For instance, if the network segment 504a represented a wireless channel, the ingress/egress node could be a base station (e.g., any of the network base stations 106a-b, 118, 120, and 122 of FIG. 1) providing coverage to a group of user equipment (e.g., any of the user equipment 108a-c, 124, 126a-c, 128, 130, and 132 of FIG. 1).

In an embodiment, the link capacity monitor 518 may be part of the receiver 502, and the time-varying network segment 504b may be associated with a wireless channel of a network base station. In this embodiment, the receiver 502 may be in a wireless cell served by the base station 504a and it would be capable of detecting and reporting the receive link quality to the link capacity monitor's 518, based on real time measurements of various network communications metrics and the status of ingress transmissions originated by the base station 504a. Implicit in the link capacity monitor 518 function is the assumption that it can monitor a link that handles all the network traffic occurring on the link between the sender 512 and the receiver 502, for a given receiver 502. For example, in FIG. 5, there is no other network segment other than the monitored link 504a connecting the adjacent segment 506 to the receiver 502.

In an embodiment, the link capacity monitor's 518 function is to determine the network segment 504a capacity (e.g., the max link throughput 414 depicted in FIG. 4B) and then report it 520 to the sender's data transfer agent 514 and link profiler 516 (e.g., the data transfer agent 210 and link profiler 214 of SPD 200). It should be understood that the link capacity monitor 518 may monitor the network segment 504a having the property that the segment's throughput capacity 504b can change over time due to any of the factors listed above (related to changes in radio communications quality) that are unrelated to shared-link congestion. It should also be understood that the link capacity monitor 518 reports are specific to a particular receiver device 502 and identified in some scenarios by the receiver's network address (e.g., its network IP address) or another unique identifier.

In an embodiment, the data transfer agent 514 and/or the link profiler 516 may be part of a SPD 200, a sender 512, or any other backhaul connected computing device. In another embodiment, the data transfer agent 514 and/or the link profiler 516 may be associated with or in communication with the receiver 502. In an embodiment, the receiver 502 may determine the sender-to-receiver throughput performance and then report it 522 to the data transfer agent 514 and/or the link profiler 516. It is understood that this report may be specific to a particular receiver 502 and it may be identified in some scenarios by the receiver's network address (e.g., its network IP address) or another unique identifier.

In an embodiment, the function of the link profiler 516 is to determine the current throughput capacity of the combined series of end-to-end network segments 504a-b, 506, 508, and 510, between the sender 512 and the receiver 502. The link profiler 516 may perform this function by receiving feedback reports 520, 522 from the link capacity monitor 518 and the receiver 502. The throughput feedback reports 522 may indicate the end-to-end throughput performance for the combined network segments 504a-b, 506, 508, and 510 connecting the sender 512 to the receiver 502. In contrast, the link capacity throughput feedback reports 520 may indicate the throughput performance for only the network segment 504a associated with the link capacity monitor 518.

In an embodiment, there may be two opposite scenarios encountered by the system 500 of FIG. 5. In the first scenario, the link capacity feedback 520 may indicate equal or lower throughput than the throughput feedback 522. In this scenario, the monitored link 504a may be determined to be the "bottleneck link" in the series of end to end segments 504a-b, 506, 508, and 510 connecting the sender 512 to the receiver 502.

In the second scenario, the link capacity feedback 520 may indicate greater throughput than the throughput feedback 522. In this scenario, the monitored link 504a may be determined NOT to be the "bottleneck link" in the series of end to end segments 504a-b, 506, 508, and 510 connecting the sender 512 to the receiver 502.

In the first scenario, the data transfer agent 514 may elect to temporarily ignore the historical end-to-end link peak performance throughput value. The goal may be to temporarily accept the monitored link 504a as the "bottleneck link" that is controlling/limiting the end-to-end network capacity.

In the second scenario, the data transfer agent 514 may elect to ignore the monitored link 504a capacity, since the "bottleneck link" is determined to be elsewhere within the network segments 504a-b, 506, 508, and 510 connecting the sender 512 to the receiver 502. The objective in this case, may be to rely on historical end-to-end link peak performance to determine the end-to-end network capacity.

In an embodiment, the link profiler 516 may present to the data transfer agent 514 the current end-to-end bottleneck throughput capacity (unrelated to network congestion), whether it is limited by a time varying network segment 504a or one of the fixed capacity segments 506, 508, or 510 in the end-to-end path between the sender 512 and the receiver 502. The data transfer agent 514 may then use this information to distinguish between cases of shared network segment congestion and cases where a time varying capacity segment 504a has become the bottleneck portion of the path 504a-b, 506, 508, and 510 between the sender 512 and receiver 502. It should be understood that there could be multiple monitored network segments, each with an associated link capacity monitor 518, all reporting to the data transfer agent 514 and the link profiler 516. In all cases, the link profiler 516 may select the smallest of the multiple reported link capacities 520 for comparison with the throughput feedback 522.

In an embodiment, the function of the data transfer agent 514 may be to provide control and status information to the sender 512 that the sender 512 uses to control the pace of data flow to the receiver 502. In an embodiment, described in U.S. Pat. No. 7,500,010, ADAPTIVE FILE DELIVERY SYS- TEM AND METHOD, Harrang et al., issued on Mar. 3, 2009, an adaptive throttling agent, also referred to herein as a data transfer agent 210, may determine the maximum average throughput rate of the sender-to-receiver data flow, Rmax, which can then be enforced by either the receiver 502 or the sender 512, for example by pacing the rate of requests from the receiver 502 for subsequent portions of the data file being transferred. In an embodiment, Rmax can be determined by the ATA 514 by comparing the end to end link capacity (calculated by the link profiler 516) with the throughput 522 reported by the receiver 502.

In an embodiment, the data transfer agent/ATA 514 may also receive monitored link capacity reports 520, which could be used to identify situations when the monitored link 504a is the bottleneck (using similar methods described for the link profiler 516). In those situations the data transfer agent 514 could optionally alter the method for calculating Rmax (e.g., by backing off Rmax below the current throughput capacity more or less aggressively). In an embodiment, Rmax should not be set lower than the current end to end link throughput in cases where the sender to receiver links 504a-b, 506, 508, and 510 are already running at full rate, unaffected by congestion.

Figure 6:
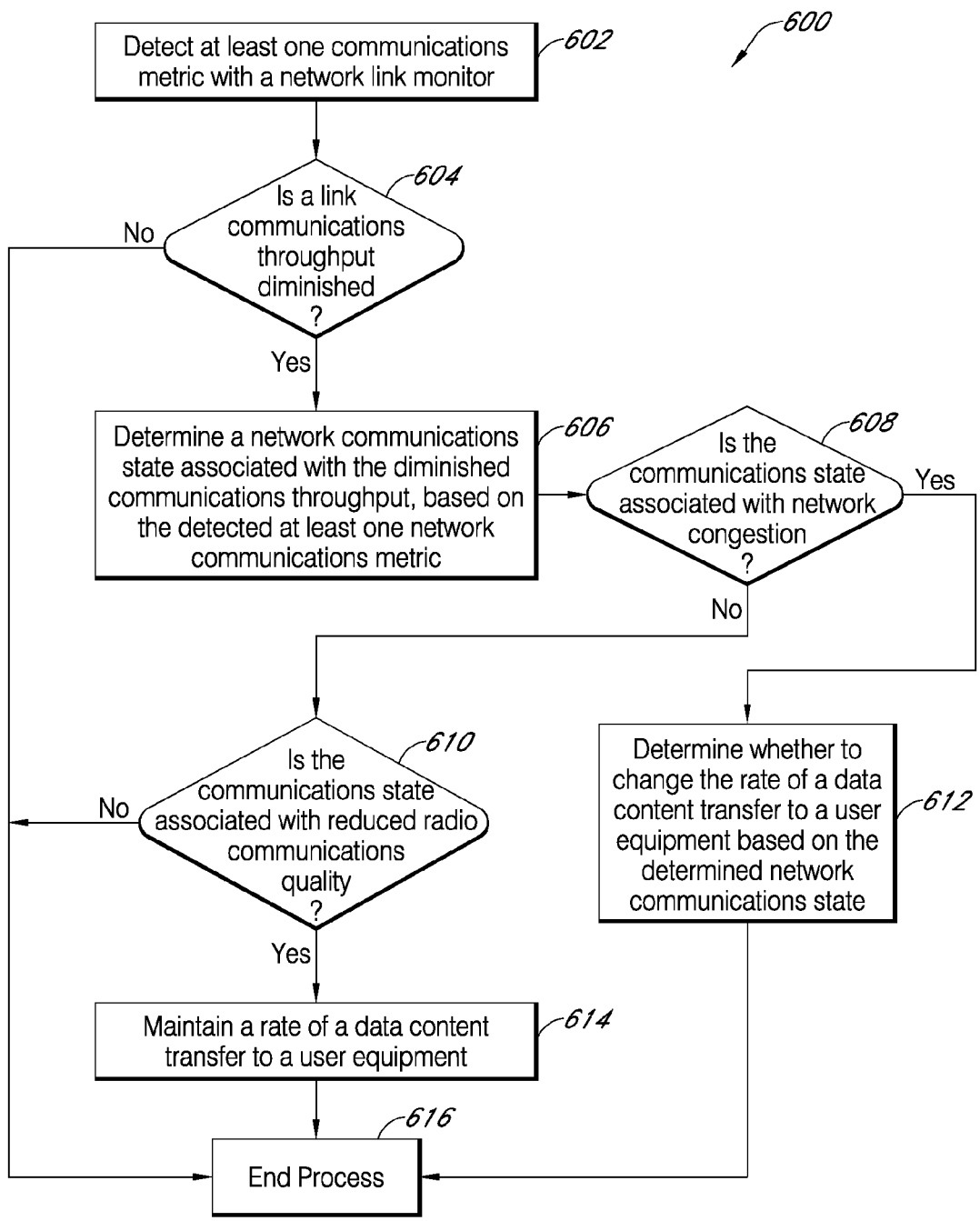
FIG. 6 illustrates a flow diagram depicting network communications state determination and data content transfer rate assignment processes, associated with embodiments of the present invention.

FIG. 6 illustrates a flow diagram 600 depicting network communications state determination and data content transfer rate assignment processes, associated with an embodiment of the present invention. It should be understood that this process 600 could be executed using one or more computer-executable programs stored on one or more computer-readable media located on any of the network computing system's 100 SPDs 106a-b, 110, 112, 114, 116, 118, 120, and 122 of FIG. 1 (or on any other common service provider device) or user equipment 108a-c, 124, 126a-c, 128, 130, and 132, without departing from the spirit and scope of the present invention. At block 602, a link capacity monitor 518 may detect at least one communications metric (e.g., an employed modulation and coding scheme (MCS), a signal to interference plus noise ratio (SINR), a remaining link capacity, or a designated peak throughput for at least one service subscriber, etc.) associated with data communications between a sender 512 and a receiver 502 of the monitored link. Then at decision block 604, it is determined if a link communications throughput is diminished (e.g., by analyzing the at least one communications metric). If it is determined that a link communications throughput is diminished, the process proceeds to block 606, where a network communications state associated with the diminished communications throughput is determined, based on the detected at least one network communications metric. Subsequently, the process proceeds to decision block 608. However, if it is determined that a link communications throughput is NOT diminished, and then the process end at block 616.

At decision block 608 it is determined if the communications state is associated with network congestion. If it is determined that the communications state is associated with network congestion, then the process proceeds to block 612, where it is determined whether to change the rate of a data content transfer to a user equipment, based on the determined network communications state. Subsequently, the process ends at block 616. However, if it determined that the communications state is NOT associated with network congestion, then the process proceeds to decision block 616, where it is determined if the communications state is associated with reduced radio communications quality. If the communications state is NOT associated with reduced radio communications quality, then the process ends at block 616. However, if the communications state is associated with reduced radio communications quality, then the process proceeds to block 614 where a rate of a data content transfer is maintained to a user equipment. This is so, because the rate of data content transfer will likely not affect cross traffic, due to the fact that the communications state is not associated with network congestion. Subsequently, the process ends at block 616.

Figure 7:
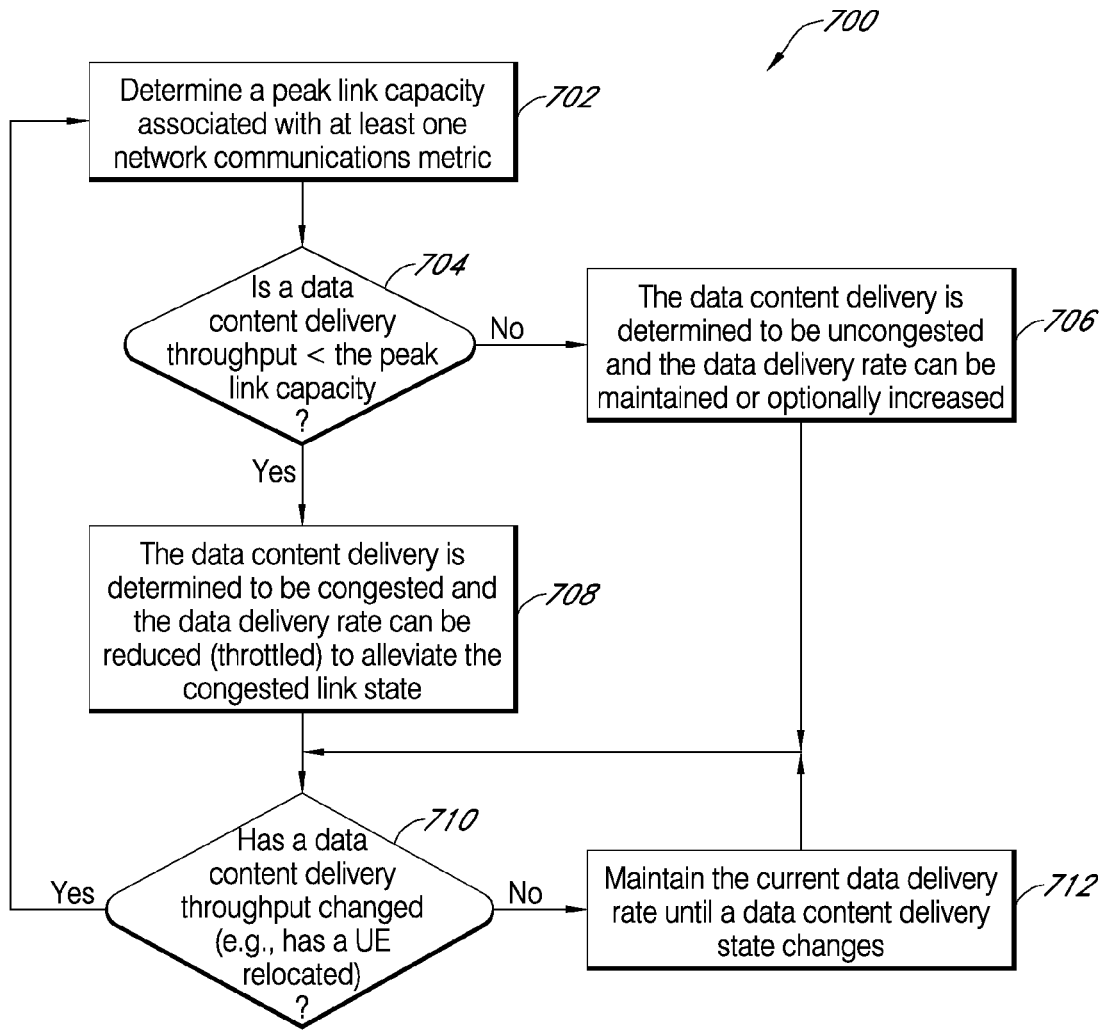
FIG. 7 illustrates a flow diagram depicting processes of peak network link capacity comparisons with actual data content delivery throughput and subsequent data content delivery rate assignment, based on the comparative results, in accordance with embodiments of the present invention.

FIG. 7 illustrates a flow diagram 700 depicting processes of peak network link capacity comparisons with actual data content delivery throughput and subsequent data content delivery rate assignment, based on the comparative results, that are associated with an embodiment of the present invention. It should be understood that this process 700 could be executed using one or more computer-executable programs stored on one or more computer-readable media located on any of the network computing system's 100 SPDs 106a-b, 110, 112, 114, 116, 118, 120, and 122 of FIG. 1 (or on any other common service provider device) or user equipment 108a-c, 124, 126a-c, 128, 130, and 132, without departing from the spirit and scope of the present invention. At block 702, a peak link capacity associated with at least one network communications metric is determined. Next, at decision block 704, it is determined if a data content delivery throughput is less than the determined peak link capacity, within a service provider specified tolerance. If the data content delivery throughput is less than the determined peak link capacity, then the process proceeds to block 708, where the data content delivery is determined to be congested and the data delivery rate can be reduced (e.g., throttled) to alleviate the congested link state.

Subsequently, the process proceeds to decision block 710 where it is determined if the data content delivery throughput has changed (e.g., due to relocation of the user equipment or due the addition of an interference source). If it is determined that the data content delivery throughput has changed, then the process starts over again at block 702, where a peak link capacity associated with at least one network communications metric is determined. However, if it is determined that the data content delivery throughput has NOT changed, then the process proceeds to block 712 where the current data delivery rate is maintained until a data content delivery state changes. The process then reverts back to decision block 710.

However, if at decision block 704 it is determined that a data content delivery throughput is NOT less than the peak link capacity, then the process proceeds to block 706 where the data content delivery is determined to be uncongested and the data delivery rate can be maintained or optionally increased. Subsequently, the process proceeds to decision block 710.

Figure 8:
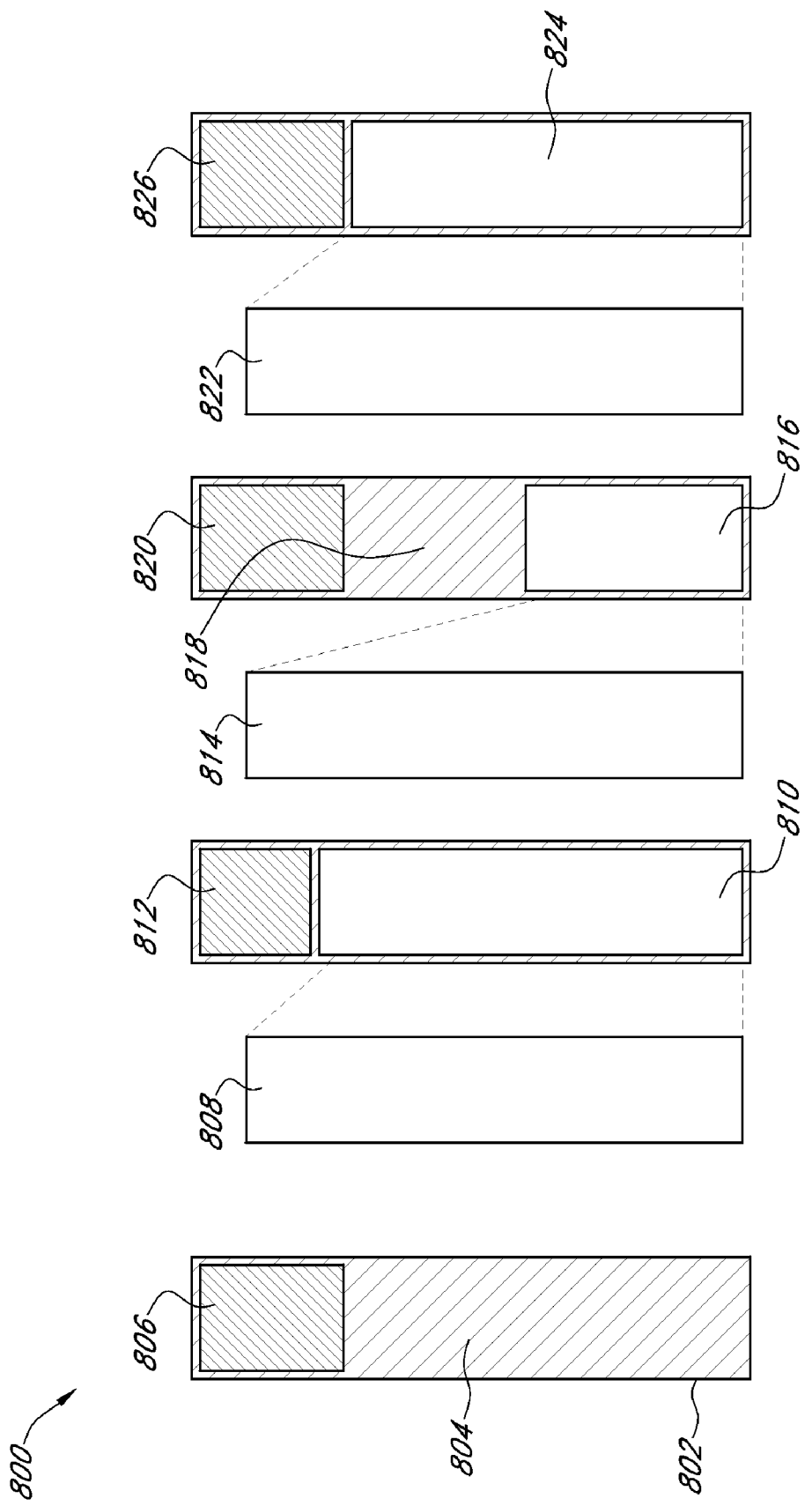
FIG. 8 illustrates four representational block diagrams depicting various channel usage scenarios associated with processes of determining and using surplus network capacity, in accordance with embodiments of the present invention.

FIG. 8 illustrates four representational block diagrams 800 depicting various channel usage scenarios associated with processes of determining and using surplus network capacity, in accordance with embodiments of the present invention. These operational scenarios illustrate the impact of user traffic on a generic shared network link (e.g., a shared wireless, wired, or optical link). In an embodiment, the first channel resource diagram depicts a shared channel 804 with a total traffic throughput capacity depicted by the size of the block 802. A portion of this capacity may be being consumed by cross traffic 806, which can be defined to be traffic that is not involved in a content file delivery job controlled a data transfer agent/ATA 514 of this invention. It should be understood that cross traffic generally has higher priority than content delivery traffic for the purposes of this invention. For example, voice data communication cross traffic would generally be more important to maintain than media content file delivery processes.

In the second channel resource diagram (on the right of the first channel resource diagram), the shared channel is being occupied by cross traffic 812 and content delivery traffic 810 with the combined effect that the sum of the traffic fully consumes the channel. The block on the left 808 illustrates the volume of offered traffic for content file delivery. As is shown, both the cross traffic 812 and the content delivery traffic 810 are constrained to less than the offered volume 808 (e.g., 812 is smaller than 806 and 810 is smaller than 804), so the channel is congested. This may be the situation when fair-share transport protocols such as TCP arbitrate the throughput on shared links.

In the third channel resource diagram (on the right of the second channel resource diagram) a similar situation is depicted, where the channel 818 is occupied by cross traffic 820 and content delivery traffic 816. In this case, however, only the offered content delivery traffic 816 has been aggressively throttled, whereas, the cross traffic 820 is unconstrained. Because surplus traffic exists on the channel 818, it is not in a state of congestion.

In the fourth channel resource diagram (on the far right), the previous scenario of channel 818 (of the third channel resource diagram) has been changed to an ideal situation where the channel is fully occupied, but the volume of cross traffic 826 is unaffected. The channel is occupied by both cross traffic 826 and content delivery traffic 824. In this scenario, the offered content delivery traffic 822 has been throttled to just match the available surplus capacity on the channel so that the cross traffic 826 is unaffected, but the shared channel is fully occupied.

In an embodiment, a goal of this invention is to achieve the fourth channel resource diagram scenario (the one depicted on the far right in FIG. 8) in cases where the offered volume of content delivery traffic exceeds the available surplus capacity of the channel. The second channel resource diagram corresponds to the non-ideal default situation where ordinary fair-share transport protocols (e.g., TCP) are used. The third channel resource diagram illustrates the improved, but still non-ideal situation, where cross traffic is unaffected by aggressively throttling the content delivery traffic, but the shared channel may still have remaining surplus capacity that might otherwise be used for content delivery, but instead is being wasted.

Figure 9:
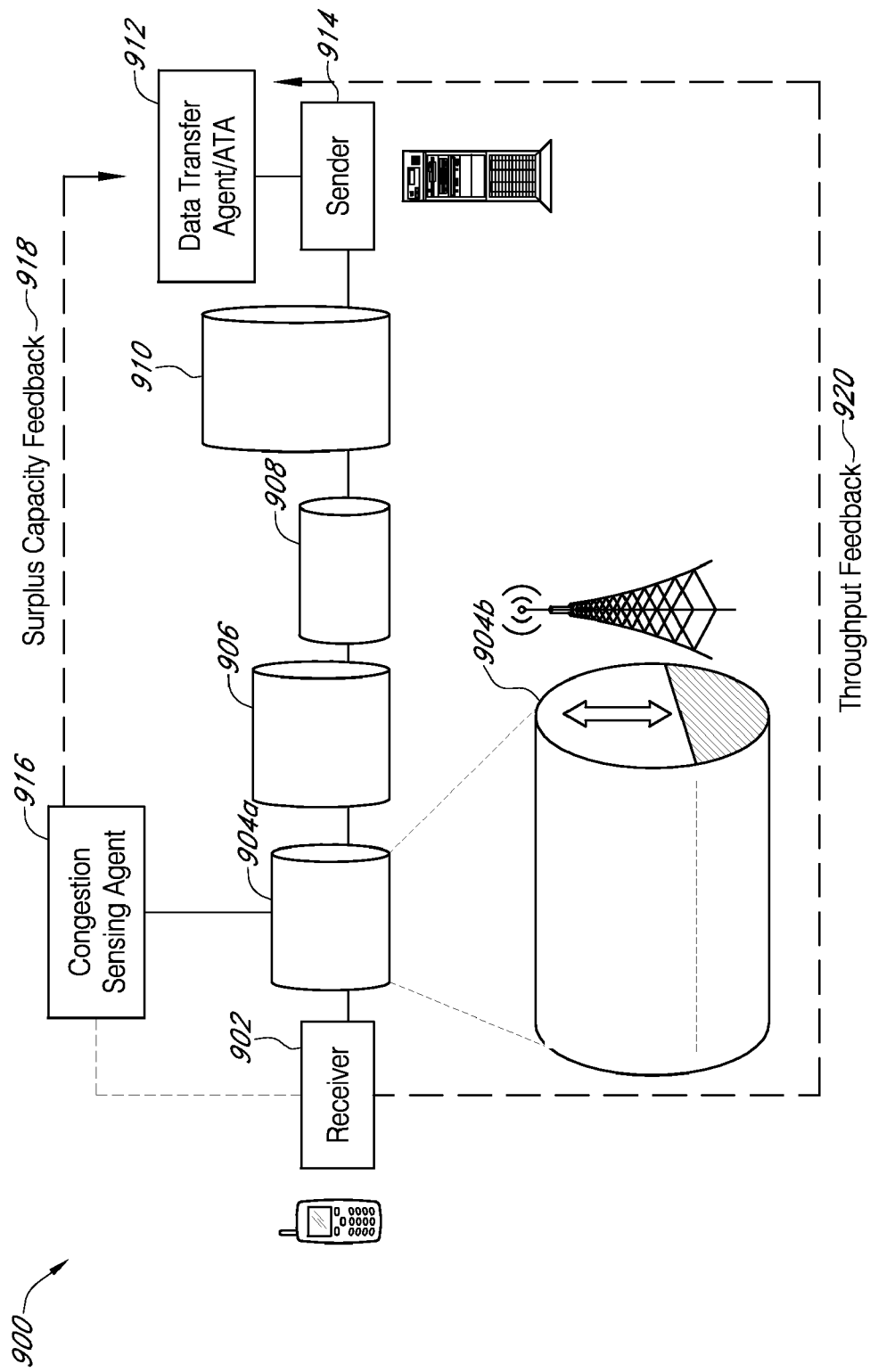
FIG. 9 illustrates a data communications system capable of performing network communications link congestion sensing and data transfer rate optimization processes, in accordance with embodiments of the present invention.

FIG. 9 illustrates a data communications system 900 capable of performing network communications link congestion sensing and data transfer rate optimization processes, in accordance with embodiments of the present invention. The components of the system 900 include a receiver device 902 (e.g., any of the user equipment 108*a-c*, 124, 126*a-c*, 128, 130, and 132 of FIG. 1), multiple channel segments or links 904*a-b*, 906, 908, and 910 (e.g., such as network base stations 106*a-b*, 118, 120, and 122, routers, gateways, switches 116, etc.), a sender device 914 (e.g., such as a media content provider or a SPD controller 110, 112, and 114), a congestion sensing agent 916, and a data transfer agent/adaptive throttling agent (ATA) 912.

In an embodiment system 900 depicts how the invention would work in a scenario where a number of network link segments 904*a-b*, 906, 908, and 910 connect a path between a sending node 902 and a receiving node 914. For sake of illustration simplicity, no distinction is shown for throughput directionality (e.g., swapping sender and receiver functions), which could in practice be different (e.g., a network link segment having a greater downlink capacity than uplink capacity). It should be understood that this characterization does not alter the overall invention architecture.

In an embodiment, the data transfer agent/ATA 912 may be associated with the sending node 914 as either an integrated sender unit or as a separate network element. In an embodiment, the data transfer agent 912 can control the throughput of data sent to the receiver 902, by monitoring throughput feedback 920 (that is based on the current throughput performance of the network) and comparing it with the known uncongested peak throughput. The link profiler 516 in FIG. 5 is not shown to simplify the illustration (its functionality is incorporated within the data transfer agent 912). It should be understood that the elements in FIG. 5 and FIG. 9 could be joined in a single embodiment (e.g., combining the two aspects of the invention), without departing from the spirit and the scope of the present invention.

In an embodiment, the congestion sensing agent (CSA) 916 may be associated with one of the network link segments 904*a-b*, 906, 908, and 910. The function of the CSA 916 is to provide surplus capacity feedback reports 918 to the data transfer agent 912. In some embodiments, the feedback may describe the current capacity of the monitored link 904*a* and the portion/fraction of that capacity that is taken up by unrelated cross traffic, as depicted in 904*b* (and in cross traffic segments 806, 812, 820, and 826). In an embodiment, unrelated cross traffic may be defined as traffic that is not involved in a data file delivery job controlled by processes of the present invention. In various embodiments, the feedback may also include the portion/fraction of capacity taken up by data file delivery jobs (e.g., from one or a plurality of senders, as depicted in 810, 816, and 824). The CSA 916 is assumed to monitor a link 904*a* that handles all the traffic between the sender 914 and receiver(s) 902. For example, there is no other network segment other than the monitored link 904*a* connecting the adjacent segment 906 to the receiver 902.

In an embodiment, the data transfer agent 912 uses the surplus capacity feedback in cases where the monitored link 904*a* might otherwise be under filled by the backoff policy applied by the data transfer agent 912. Based on the feedback, the data transfer agent 912 may elect to dynamically alter the backoff policy in order to submit more traffic into the network until the monitored link 904*a* is filled or has achieved some pre-determined fill fraction. It should be understood that in certain scenarios, the surplus capacity feedback reports 918 may include the individual and sum use of the monitored link 904*a* for one or a plurality of content delivery jobs. In an embodiment, these jobs can be classified by transport layer flow ID (e.g. TCP port number), a receiver network address, or any other unique identifier, or a set of unique identifiers. The data transfer agent 912 may use this information to determine which content delivery sessions need to be adjusted/throttled in order to achieve the optimum aggregate throughput across the monitored link 904*a*.

In an embodiment, purposely relaxing the backoff policy may risk congesting another bottleneck link segment and negatively impacting cross traffic. In an embodiment, this could be avoided by placing CSA's 916 on all network segments so that the bottleneck link could be monitored and advantageously filled below a level 904*b* that would cause congestion (this is particularly important when a link was in the middle of a chain of links). In an embodiment, when the monitored link 904*a* were placed on the last link in a chain of links 904, 906, 908, and 910 (as is depicted in FIG. 9), between a sender 914 and a receiver 902 (e.g., a wireless airlink) and known to be (or likely to be) the bottleneck link by network architecture design. In this case, completely filling the monitored link 904*a* would present little risk to other links in the network.

In other scenarios, the monitored link 904*a* may or may not be included in the path of multiple receivers (e.g., any of user equipment 108*a-c*, 124, 126*a-c*, 128, 130, and 132 of FIG. 1) connected to a single sender 914. In that case, only those receivers 902 with a path that includes the monitored link 904a should have their backoff policy adjusted. In the preferred embodiment, this scenario may be obviated by installing the CSA 916 on a link where traffic for one or a plurality of receivers (e.g., any of user equipment 108a-c, 124, 126a-c, 128, 130, and 132) is guaranteed by network architecture to pass through the link 904a (e.g., a wireless airlink of a cellular base station). Then, by using the network addresses of the receivers 902 attached to the link 904a, the CSA 916 can relay to the data transfer agent 912 the attached receiver surplus feedback capacities 918 so that the data transfer agent 912 may adjust the backoff algorithm for the appropriate "in progress" data transfer jobs. Alternatively, the receiver 902 may know the identity of the CSA 916 (e.g. identified by base station ID and sector for a wireless base station) and the receiver 902 may report that information so that the identity of the receiver 902 can be correlated with the appropriate CSA report. In other scenarios, the CSA 916 may be integrated within the receiver 902 so that the CSA report and CSN identity can be sent along with its network address directly to the data transfer agent 912.

Figure 10:
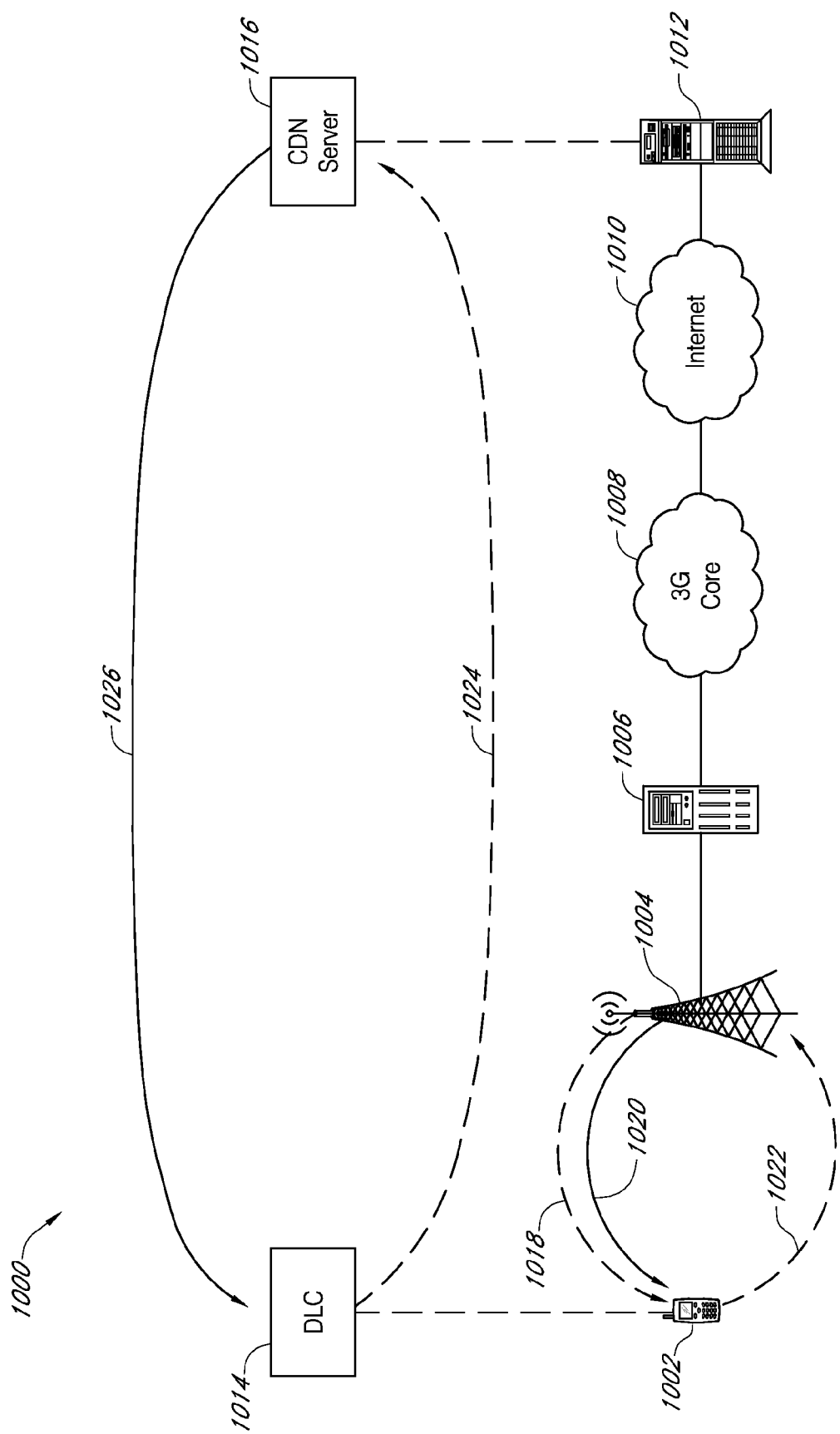
FIG. 10 illustrates a cellular data communications system (with an HSPA cellular airlink) capable of network communications link monitoring and data transfer rate optimization processes, in accordance with an embodiment of the present invention.

FIG. 10 illustrates a cellular data communications system 1000 (with an HSPA cellular airlink) capable of network communications link monitoring and data transfer rate optimization processes, in accordance with an embodiment of the present invention. This system may be viewed as a real world example of the higher level systems depicted in both FIG. 5 and FIG. 9. In an embodiment, the system 1000 consists of a downlink client 1014 (DLC, that is optionally part of a user equipment 1002), and a content distribution node server 1016 (CDN, that is optionally part of a SPD 200 or media content provider 1012) that are networked by a wireless radio link between the user equipment 1002 and a network base station 1004 (e.g., a nodeB) via a backhaul link between the base station 1004 and a radio network controller 1006 (RNC), and by a 3G core network 1008 and packet domain network such as the Internet 1010 between the RNC 1006 and CDN 1012.

In an embodiment, communications between the CDN server 1016 and the DLC 1014 may be facilitated by a forward content delivery channel 1026, and a reverse uplink control channel 1024. It should be noted that data delivery channels are indicated by a solid line (e.g., 1026, and 1020), whereas control channels are indicated by a dotted line (e.g., 1024, 1018, and 1022).

In an embodiment, a content delivery channel CDCH 1026 carries the actual content data and downlink response (DL-RSP) header information including the permitted average throughput rates (max and min) used by the DLC 1024 to pace the request for pieces of the content file in downlink requests (DLREQ) of the uplink control channel UCCH 1024. The UCCH 1024 carries the DLREQ's as well as information which allows the CDN server 1016 to distinguish whether the radio link between the base station 1004 and user equipment 1002 is congested or running under its peak rate, due to suboptimal radio conditions (e.g., conditions caused by interference). This information may include the user equipment's 1002 computed peak capacity as determined by the channel quality indicator (CQI) process on the HS-DPCCH 1022 (a dedicate HSPA physical control channel) and in some scenarios the ACK/NACK process or other goodput statistics, the surplus channel capacity as determined by the base station 1004, and the base station ID as determined by the base station 1004 and broadcast to all user equipment 1002 (although only a single user equipment is shown in FIG. 10 for illustrative simplicity) attached to the channel. The DLREQ carries information including the DLC 1014 ID, actual burst transfer rate R, the imposed average rate <R> (from interjected wait intervals), as well as the size of the next piece of the file to transmit.

In an embodiment, for a given 3G HSPA channel, the base station 1004 may establish a forward high-speed shared control channel (HS-SCCH) 1018, a forward high-speed downlink shared channel (HS-DSCH) 1020 and a reverse high-speed dedicated physical control channel (HS-DPCCH) 1022. The HS-SCCH 1018 may be used for sending a shared reverse link transmit schedule and it could also optionally carry the channel surplus capacity as a custom implementation message. The HS-DSCH 1020 may be used to carry the actual bearer data to the user equipment 1002. The HS-DPCCH 1022 can carry the CQI reports and radio link packet ACK/NACK messages to the base station 1004. The CQI reports may be sent at relatively high rates (e.g., at 500 Hz) allowing the base station 1004 to rapidly adjust the forward channel modulation coding scheme (MCS) as well as the appropriate forward channel transmit power. These same CQI reports (suitably sampled to obtain a stable value) may be used by the DLC 1014 to determine the peak rate that the user equipment 1002 could be using for the radio link, if permitted by the base station's scheduler.

In an embodiment, the CDN server 1016 may keep track of the peak useable network capacity as identified by the user equipment's 1002 network attachment information (e.g., its IP address, base station ID, sector ID, etc.) and also the user equipment's 1002 radio link peak capacity. The server 1012 may select the appropriate metric to determine whether the radio link is congested or merely operating sub-optimally due to local channel conditions (e.g., such as conditions caused by radio channel interference sources). For example, determining the peak allowed average throughput rate Rmax may be based on comparing MIN (radio link peak capacity, peak useable network capacity) with the observed actual burst throughput rate R. In other words, if the radio link peak capacity for a the user equipment 1002 is lower than its profiled peak network capacity, then only the radio link peak capacity is used in comparison with the observed burst throughput to determine Rmax.

The CDN server 1016 also monitors the available channel surplus capacity (reported by its clients) and tracks which DLC 1014 clients are operating on that channel. The CDN server 1016 can use this information to identify congestion situations where many concurrent DLC sessions are suboptimally using the channel, adjusting the Rmax calculations so that the channel is fully used. For example, the following formula may facilitate this calculation adjustment:

$$Rmax'=Rmax+BWsurplus/NumJobs$$

Where Rmax is calculated based on Min(Rpeak, R(CQI)),
Rpeak=the profile peak bandwidth for the IP address,
R(CQI)=the reported UE link bandwidth,
NumJobs=the number of active UE on the wireless channel, and
BWsurplus=the surplus channel capacity In the above formula, if the channel is fully occupied (e.g., where BWsurplus is equal or near 0), then no additional adjustment of Rmax is required (Rmax'=Rmax). Otherwise, if there is some unused channel surplus bandwidth (e.g., BWsurplus>0) then the calculated Rmax could be increased by sharing the surplus with the other DLC sessions (e.g., equally in proportion to the number of jobs, or in some scenarios by some weighted fraction based on job priority).

In an embodiment, this situation can arise when sensed congestion by the CDN server 1016 comes primarily from other DLC clients (not shown) rather than unrelated cross traffic. In those situations, depending on the backoff algorithm used to calculate Rmax, the server 1012 can instruct each DLC 1014 to reduce its average throughput rate to allow cross traffic preferential access to the channel. In scenarios where there is little or no cross traffic, this can result in an under-filled channel (self-backoff scenario) but which can be corrected by sharing the surplus across the active jobs (e.g., by accelerating media content transfer rates).

It should be understood that the described mechanisms of system 1000 are best applied in scenarios where the radio link (the link between the base station 1004 and the user equipment 1002) is normally the bottleneck network segment between the CDN server 1016 and DLC 1014, as is typical of actual wireless access networks. In rare scenarios, if another network segment turns out to be the bottleneck (e.g., in the 3G core 1008) and at the same time the user equipment 1002 were experiencing poor radio link conditions (e.g., due to one or more interference sources), then the CDN server 1016 might back off less aggressively than if it were simply using the peak network capacity for comparison as to the degree of network congestion.

In other alternate embodiments, it may not be possible for the base station 1004 to provide broadcast updates to the user equipment 1002 of the surplus radio channel capacity (i.e., custom messaging capability may not be available). In this circumstance the CDN server 1016 could still identify the self-backoff condition by pre-provisioned knowledge or estimation of the radio link capacity (i.e. associated with the RBSID or other shared radio channel identifier). In an embodiment, the CDN server 1016 could time multiplex concurrent DLRSP bursts so that the total radio link capacity was never exceeded.

For example, if a burst of DLREQ requests 1024 arrived at the CDN server 1016 the server 1012 could process the requests in order, but it may temporarily hold back requests so that a maximum number of concurrent responses, being transmitted end to end, was not exceeded. Doing this could introduce additional delay in the transfer rate, thereby lowering a communications session's average transfer rate. However, the overall aggregate transfer efficiency may improve by not having multiple DLC sessions contending against each other and backing off sub optimally. In an embodiment, another possible approach could be to temporarily halt lower priority transfer sessions, thereby allowing a maximum number of higher priority sessions to proceed consistent with the known or estimated radio link capacity.

In other embodiments other wireless networks may be employed without departing from the spirit and scope of the present invention. These alternate networks may include, but are not limited to: 3G networks such as CDMA2000/EVDO or 4G LTE having equivalent MCS control mechanisms (e.g., Digital Rate Control) and they can use very similar methods to those described with reference to FIG. 10 (the CDMA2000 and WCDMA 3G architectures are highly parallel as developed by 3GPP2 and 3GPP respectively). Other radio networks such as WiMAX have similar information available to the terminal units and could also use the same concepts to achieve similar results.

Figure 11A:
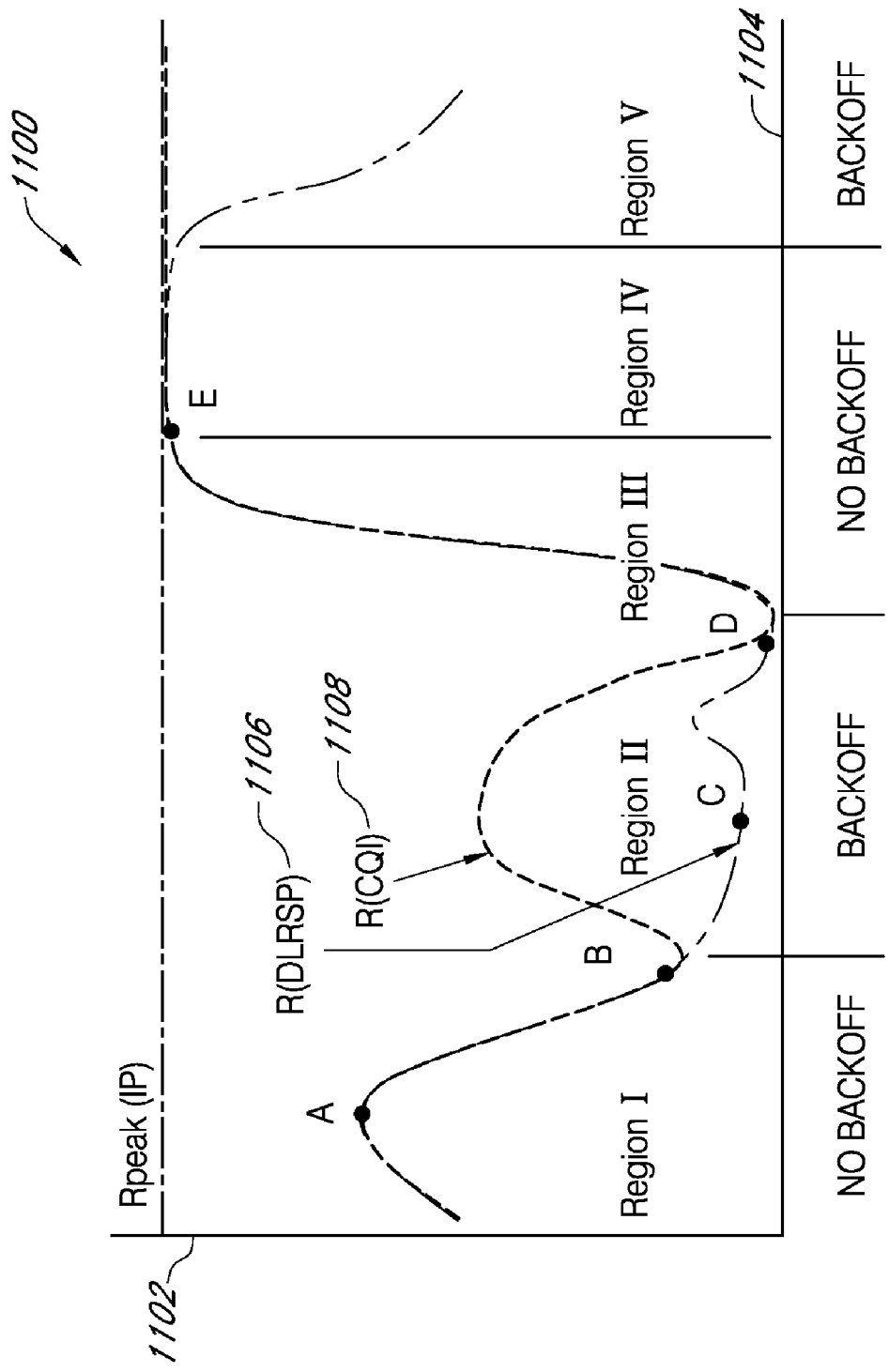
FIG. 11A illustrates plots of downlink response (DLRSP) and channel quality indicator (CQI) report rates for various network locations (corresponding locations are depicted in FIG. 11B) and environments, in accordance with embodiments of the present invention.
Figure 11B:
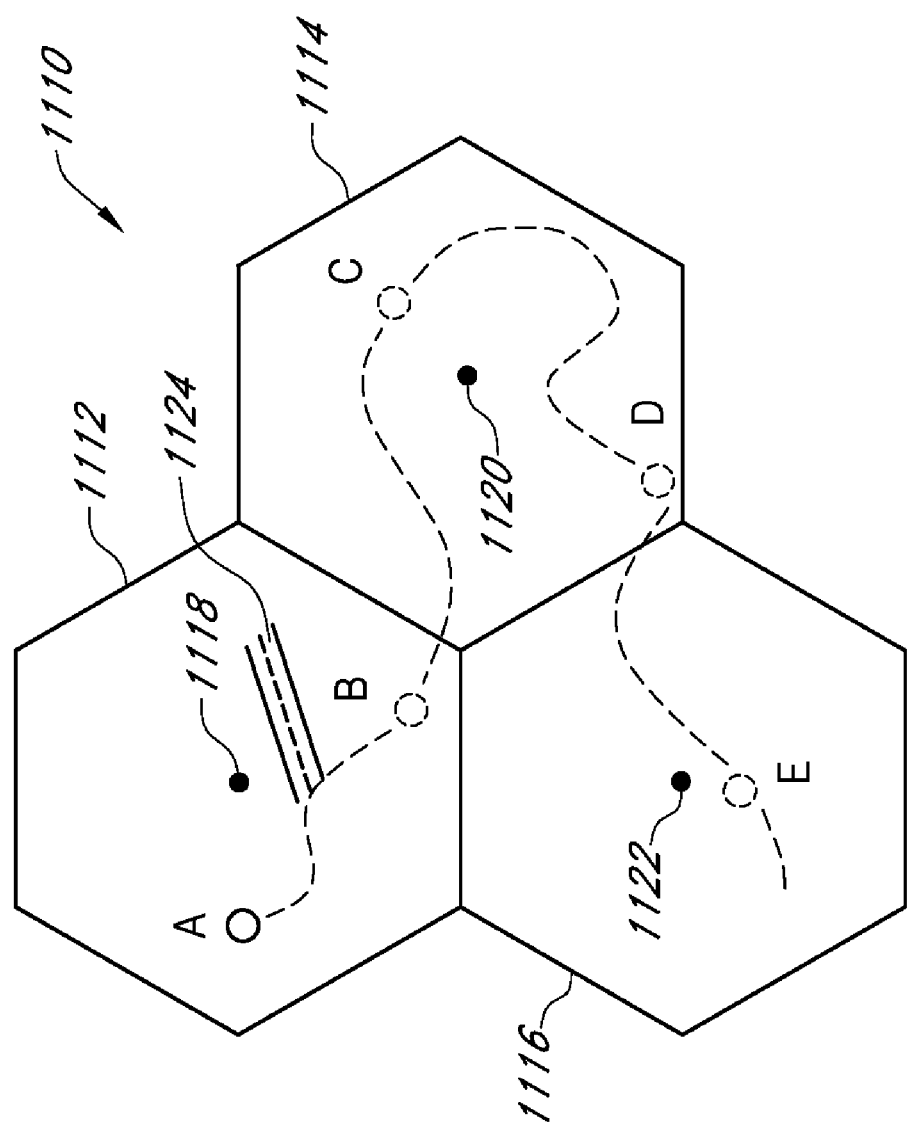
FIG. 11B illustrates a network cell topology depicting various user equipment locations corresponding the DLRSP and CQI report rate plots of FIG. 11A, in accordance with embodiments of the present invention.

FIG. 11A depicts a graph 1100 of downlink response (DL-RSP) and channel quality indicator (CQI) report rates for various network locations (with corresponding locations depicted in FIG. 11B) and environments, in accordance with embodiments of the present invention. On the graph, the vertical axis relates to a channel throughput rate, where Rpeak(IP) is the profile peak bandwidth for the UE IP address (assuming ideal conditions with no congestion and without reduced radio communications quality). The horizontal axis relates to time, and the plotted points A, B, C, D, and E, each represent positional changes over a period of time for a user equipment that moves amongst various network cells (See the UE path around network cells 1112, 1114, and 116 of FIG. 11B).

In Region I, the R(DLRSP) curve 1106 tracks the R(CQI) curve 1108, both of which are below Rpeak(IP). This tracking indicates that there is no substantial link congestion, however the radio communications throughput changes in response to radio communications signal strength (e.g., related to a UE's proximity to a network base station 1118) and quality changes (e.g., related to one or more sources of interference 1124 between the UE and the base station). For example, at position A, both the R(DLRSP) curve 1106 and the R(CQI) curve 1108 are significantly higher than they are at position B, even though the UE at position A and position B may be roughly equidistant from the base station 1118. This phenomenon may be due to the fact that there is an additional interference source 1124 between the UE at position B and the base station 1118. Due to the fact that there is no network congestion to which decreased throughput can be attributed to, the data transfer rate for the UE communications should be maintained (no backoff is required because it will likely not affect aggregate user throughput).

Next, in Region II at position C, within cell 1114, the R(DLRSP) curve 1106 is seen to be much lower than the R(CQI) curve 1108. This is an indication of network congestion. Accordingly, the UE communications should be throttled to alleviate congestion on the link and prioritize cross traffic communications (e.g., voice communications). Then in Region II/III at position D, as the user equipment enters cell 1116 from cell 1114, the R(DLRSP) curve 1106 is again tracking the R(CQI) curve 1108. This is likely due to the fact that the state of network congestion is alleviated by communications with base station 1122, which may have a much lower traffic load than that of base station 1120. Unfortunately, the data transfer rate is still very low due to the distance between the UE at position D and either base station 1120 or 1122. Accordingly, no backoff is warranted, because there is no congestion to alleviate.

Then in Region IV at position E, within cell 1116, the UE transitions to a location very close to base station 1122. In this location, the R(DLRSP) curve 1106 is tracking the R(CQI) curve 1108, so there is no substantive network congestion and no backoff is required, that is until Region V where congestion is again experienced and backoff may be employed.

In an embodiment, a user may request a content delivery to their portable battery-powered device (e.g., any of user equipment 108*a-c*, 124, 126*a-c*, 128, 130, and 132 of FIG. 1). The delivery may be proceeding in the background. At some point the user may decides to power-off the device (e.g., prior to the user going to sleep at night in order to save device battery power). Prior to shutting down the device, the ongoing content delivery session may be detected and a user alert/prompt informs the user that a data content delivery session is ongoing. The user is asked via the alert/prompt whether they wish to continue the content data delivery or proceed with the shut down the device. If the user elects to continue the delivery, a user alert/prompt may request the user to connect the device to a power mains/source (in order to preserve/recharge the device's battery resources) and the content delivery session can continue. However, if the user elects to shut down the device instead, the session may be paused and it can resume when the device is again powered-on.

In an embodiment, the invention may consist of a software algorithms/modules running on a mobile user equipment (e.g., on any of the user equipment 108*a-c*, 124, 126*a-c*, 128, 130, and 132 of FIG. 1) and in some embodiments on a base station (e.g., on any of the base stations 106*a-b*, 118, 120, and 122 of FIG. 1), or a base station controller (e.g., on any of the controllers devices 110, 112, and 114 of FIG. 1), access service node, access point, manager, communication module, etc.) and a remote sender/receiver in communication with the user equipment.

In one embodiment, the user equipment software may continually evaluate the user equipment's peak link capacity derived from inputs including one or more of the wireless channel modulation and coding, signal to interference plus noise ratio, free capacity, service rate-limit policy, etc. The user equipment may use these inputs to calculate the peak link capacity defined as the throughput the user equipment could achieve if not otherwise limited by shared channel traffic presented by other users. It should be understood that the peak link capacity could equally be determined remotely (e.g., by a base station or base station controller or any other external computing module communicating with the user equipment).

In an embodiment, when a user equipment is performing a content file delivery, if the delivery throughput is at or near the calculated peak link capacity, then the end-to-end delivery path may be considered to be uncongested and the transfer can proceed unthrottled. If the delivery throughput is lower than the calculated peak link capacity (within a predetermined tolerance level), then the end-to-end delivery path may be determined to be congested and the transfer may be slowed to avoid impacting unrelated cross traffic using the channel. In an embodiment, as the user equipment moves between locations of varying radio coverage, the calculated wireless peak link capacity may vary so that a benefit of the invention is that by communicating the current peak link capacity, the end-to-end throughput variation is not confused by the throttling algorithm with shared channel congestion that similarly slows content file delivery performance.

In an embodiment, the invention may address the amount of throughput throttling or backoff the system should apply in order to minimally affect concurrent unrelated cross traffic using a shared wireless channel. In an embodiment, a software algorithm/module running on a base station (or alternately, a base station controller, or any other well known SPD) periodically determines the aggregate volume of unrelated cross traffic using the channel. The algorithm may also periodically determine the aggregate channel throughput available to user traffic. The difference between these two measurements indicates the remaining surplus capacity on the channel that is available for content file transfers. In scenarios where an aggregate shared channel is congested, the surplus capacity indication may be fed back into the bandwidth throttling algorithm to adjust the volume of offered content delivery traffic to just equal the surplus bandwidth.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for delivering digital data content, the networked computing system comprising:
   a network data sender device;
   user equipment;
   a network link monitor;
   a data transfer agent; and
   a data communications network facilitating data communications amongst all devices of the networked computing system,
   wherein the networked computing system is configured to:
   determine a throughput capacity for a network communication link extending from the data sender device to the user equipment;
   detect at least one network communications metric to thereby determine a content delivery throughput for delivering the digital data content from the data sender device to the user equipment;
   determining a network communications state and, if the network communications state indicates that the content delivery throughput is less than the throughput capacity, determine whether the diminished content delivery throughput, is caused by network congestion or underperformance of a network element in the network communication link extending from the data sender device to the user equipment; and
   cause the data sender device to throttle a transmission rate for delivering the digital data content if the diminished content delivery throughput is caused by network congestion and permitting the user equipment to control the delivery rate and thereby transfer data as fast as the network communication link will allow without throttling the transmission rate if the diminished content delivery throughput is not caused by network congestion.

2. The networked computing system of claim 1, wherein the under performance of the network element relates to a state of reduced regional radio communications quality.

3. The networked computing system of claim 1, wherein the network link monitor determines the network communications state and then communicates the determined network communications state to the data transfer agent.

4. The networked computing system of claim 3, wherein the data transfer agent determines whether to change the rate for the digital data content transfer based on the received network communications state.

5. The networked computing system of claim 1, wherein the at least one network communications metric is selectable from the group consisting of: an employed modulation and coding scheme (MCS), a signal to interference plus noise ratio (SINR), a remaining link capacity, and a designated peak throughput for at least one service subscriber.

6. The networked computing system of claim 1, wherein the data transfer agent is a component of the data sender device and the network link monitor is a component of the user equipment.

7. A non-transitory computer-readable medium encoded with computer-executable instructions for delivering digital data content, which when executed, perform a method comprising:
   determining a throughput capacity for a network communication link extending from a data sender to a user equipment;
   detecting at least one network communications metric to determine a content delivery throughput for delivering the digital data content from the data sender to the user equipment via the network communications link;
   determining a network communications state associated with a diminished content delivery throughput, based on the detected at least network communications metric; and
   causing the data sender to throttle back a sending rate for the digital data content if the diminished content delivery throughput us caused by congestion on the network communications link and permitting the user equipment to control the sending rate without causing the data sender to throttle back if the diminished content delivery throughput is not caused by congestion on the network communications link.

8. The non-transitory computer-readable medium of claim 7, wherein the network communications state relates to a state of network congestion or a state of reduced regional radio communications quality.

9. The non-transitory computer-readable medium of claim 7, wherein the method further comprises a network link monitor determining the network communications state and then communicating the determined network communications state to the data sender comprising a data transfer agent.

10. The non-transitory computer-readable medium of claim 9, wherein the method further comprises the data transfer agent selecting whether to change the rate for a data content transfer with a user equipment based on the communications with the network link monitor.

11. The non-transitory computer-readable medium of claim 7, wherein the at least one network communications metric is selectable from the group consisting of: an employed modulation and coding scheme (MCS), a signal to interference plus noise ratio (SINR), a remaining link capacity, and a designated peak throughput for at least one service subscriber.

12. The non-transitory computer-readable medium of claim 7, wherein the network link monitor is a component of a user equipment.

13. A computer-implemented method for delivering digital data content, the method comprising:
  determining a data throughput capacity on a network communication link extending from a data sending device to a user equipment;
  determining a content delivery throughput for delivery in the digital data content from the data sending device to the user equipment on the network communication link;
  determining a network communications state associated with a diminished content delivery throughput, less than the data throughput capacity, based on at least one network communications metric; and
  causing the data sender to throttle back a sending rate for the digital data content if the diminished content delivery throughput us caused by congestion on the network communications link and permitting the user equipment to control the sending rate without causing the data sender to throttle back if the diminished content delivery throughput is not caused by congestion on the network communications link.

14. The computer-implemented method of claim 13, wherein the network communications state relates to a state of network congestion or a state of reduced regional radio communications quality.

15. The computer-implemented method of claim 13, further comprising a network link monitor determining the network communications state and then communicating the determined network communications state to the data sending device comprising a data transfer agent.

16. The computer-implemented method of claim 15, further comprising the data transfer agent selecting whether to change the rate for a data content transfer with the user equipment based on the communications with the network link monitor.

17. The computer-implemented method of claim 13, wherein the at least one network communications metric is selectable from the group consisting of: an employed modulation and coding scheme (MCS), a signal to interference plus noise ratio (SINR), a remaining link capacity, and a designated peak throughput for at least one service subscriber.

18. The computer-implemented method of claim 15, wherein the network link monitor is a component of a user equipment.

19. A user equipment for affecting determinations associated with a data content transfer, the user equipment comprising:
  at least one processor;
  at least one memory storing a network link monitor; and
  a data communications component,
  wherein the network link monitor of the user equipment is configured to:
  detect at least one network communications metric;
  determine a network communications state associated with a content delivery throughput that is less than a data throughput capacity for a network communication link extending from a data sending device to the user equipment, based on the detected at least one network communications metric; and
  wherein the user equipment is configured to transfer the determined network communications state to the data sending device in order to facilitate a determination of a rate for a data content transfer.

20. The user equipment of claim 19, wherein the network communications state relates to a state of network congestion or a state of reduced regional radio communications quality, and the determined at least one network communications metric is selectable from the group consisting of: an employed modulation and coding scheme (MCS), a signal to interference plus noise ratio (SINR), a remaining link capacity, and a designated peak throughput for at least one service subscriber.

21. The networked computing system of claim 1 wherein the network communication link includes a non-wireless network portion and a wireless network portion and the network congestion occurs in the non-wireless network portion.

22. The networked computing system of claim 1 wherein the network communication link includes a non-wireless network portion and a wireless network portion and the network congestion occurs in the wireless network portion.

23. A method for delivering digital data content from a data source to user equipment in a communications network having a non-wireless network portion and a wireless network portion, the method comprising:
  determining a throughput capacity on a network communication link extending from the data source to the user equipment;
  determining a content delivery throughput for delivering the digital data content on the network communication link;
  if the content delivery throughput is less than the throughput capacity, determining if the diminished throughput capacity is caused by congestion in the wired network communication link or caused by poor link performance in the wireless network portion;
  if the diminished throughput capacity is caused by congestion in the network communication link, causing the network service provider device to throttle a transmission rate for delivering the digital data content to thereby reduce congestion; and
  if the diminished throughput capacity is caused by poor link performance in the wireless network portion, permitting the user equipment to control the content delivery throughput without throttling the transmission rate.

24. The method of claim 23 wherein the network congestion occurs in the non-wireless network portion.

25. The method of claim 23 wherein the network congestion occurs in the wireless network portion.

* * * * *